(12) United States Patent
Webster et al.

(10) Patent No.: US 8,261,951 B2
(45) Date of Patent: *Sep. 11, 2012

(54) METERING AND DISPENSING CLOSURE

(75) Inventors: Tyson L. Webster, Soquel, CA (US); M. Rinley Deeds, Felton, CA (US); James W. Livingston, Santa Cruz, CA (US); Andy Swain, Nottingham (GB); Christopher J. Webb, Dronfield (GB); Shirley A. Webb, legal representative, Dronfield (GB); David Holden, Derbyshire (GB); Kenneth J. Bird, Nottingham (GB)

(73) Assignee: Diversey, Inc., Sturtevant, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/892,509

(22) Filed: Sep. 28, 2010

(65) Prior Publication Data

US 2011/0073622 A1    Mar. 31, 2011

Related U.S. Application Data

(60) Division of application No. 11/404,518, filed on Apr. 14, 2006, now Pat. No. 7,815,072, which is a continuation-in-part of application No. 10/709,449, filed on May 6, 2004, now Pat. No. 7,090,098.

(51) Int. Cl.
*G01F 11/10* (2006.01)
(52) U.S. Cl. ..................... 222/370; 222/181.3
(58) Field of Classification Search ................ 222/217, 222/218, 225, 180–181.3, 354, 367, 370, 222/450–452, 228, 229, 237, 238
See application file for complete search history.

(56) References Cited

U.S. PATENT DOCUMENTS

| | | | |
|---|---|---|---|
| 2,477,998 A | 8/1949 | McCowan | |
| 2,584,781 A | 2/1952 | Beatty | |
| 2,670,187 A | 2/1954 | Goodrich | |
| 2,865,537 A | 12/1958 | Jackson | |
| 2,944,707 A | 7/1960 | Steinmetz | |
| 3,013,698 A | 12/1961 | Gordon et al. | |
| 3,080,074 A | 3/1963 | Hornbostel | |
| 3,201,001 A * | 8/1965 | Roberts et al. | 406/63 |
| 3,263,866 A | 8/1966 | Proctor | |
| 3,386,624 A | 6/1968 | Valente | |
| 3,840,154 A | 10/1974 | Speak | |
| 4,032,050 A | 6/1977 | Funk | |

(Continued)

FOREIGN PATENT DOCUMENTS

EP        0154897        9/1985

(Continued)

OTHER PUBLICATIONS

The Notice of Reason for Rejection from the Japanese Patent Office—Date of Dispatch Aug. 1, 2011.

*Primary Examiner* — J. Casimer Jacyna
(74) *Attorney, Agent, or Firm* — Michael Best & Friedrich LLP

(57) ABSTRACT

A metering and dispensing closure for a container wherein two rotatable disks rotate in conjunction with a stationary cap member to afford accurate measuring of a powder material and dispensing of it. The disks and the container cap afford a consistent measuring of the powder material, as well as provide a variety of drive members which can be utilized with the dispensing closure.

24 Claims, 27 Drawing Sheets

U.S. PATENT DOCUMENTS

| | | |
|---|---|---|
| 4,057,173 A | 11/1977 | Tal |
| 4,060,183 A | 11/1977 | Puurunen |
| 4,161,265 A | 7/1979 | Hauser et al. |
| 4,214,678 A | 7/1980 | Patrinos |
| 4,243,158 A | 1/1981 | Negosta |
| 4,832,235 A | 5/1989 | Palmer |
| 4,893,737 A | 1/1990 | Borjesson |
| 4,964,185 A | 10/1990 | Lehn |
| 5,007,559 A | 4/1991 | Young |
| 5,106,239 A | 4/1992 | Krebsbach |
| 5,310,090 A | 5/1994 | Taylor, Jr. |
| 5,417,939 A | 5/1995 | Bunschoten et al. |
| 5,469,992 A | 11/1995 | Jenkins |
| 5,495,962 A | 3/1996 | Nomura |
| 5,540,263 A | 7/1996 | Hustvedt et al. |
| 5,566,842 A | 10/1996 | Dennis |
| 5,758,803 A | 6/1998 | Liao et al. |
| 5,829,085 A | 11/1998 | Jerg et al. |
| 5,997,220 A | 12/1999 | Wormser |
| 6,158,486 A | 12/2000 | Olson et al. |
| 6,179,167 B1 | 1/2001 | Boot et al. |
| 6,210,533 B1 | 4/2001 | Doelle |
| 6,253,968 B1 | 7/2001 | Van Dijk et al. |
| 6,283,339 B1 | 9/2001 | Morrow |
| 6,484,905 B1 | 11/2002 | Swackhamer et al. |
| 6,491,188 B2 | 12/2002 | Doelle |
| 6,550,640 B2 | 4/2003 | Smith |
| 6,820,772 B1 | 11/2004 | Bennett, Jr. |
| 7,090,098 B2 | 8/2006 | Livingston et al. |
| 7,178,692 B2 | 2/2007 | Ophardt |
| 2003/0071061 A1 | 4/2003 | Lassota |
| 2005/0139622 A1 | 6/2005 | Saulle |
| 2007/0187433 A1 | 8/2007 | Webster et al. |
| 2008/0054014 A1 | 3/2008 | Webster et al. |

FOREIGN PATENT DOCUMENTS

| | | |
|---|---|---|
| EP | 1468744 | 10/2004 |
| GB | 1068510 | 5/1967 |
| GB | 1569697 | 6/1980 |
| GB | 2111946 | 7/1983 |
| GB | 2208659 | 4/1989 |
| GB | 2306303 | 5/1997 |
| JP | 64-022235 | 1/1989 |
| JP | 7-187260 | 7/1995 |
| KR | 20030070801 | 9/2003 |
| KR | 20-0342752 | 2/2004 |
| KR | 20-0235884 | 10/2010 |
| WO | 02/24140 A2 | 3/2002 |
| WO | 02/24140 A3 | 3/2002 |
| WO | 03/022414 | 3/2003 |
| WO | 03/023120 | 3/2003 |
| WO | 2005/114115 | 12/2005 |

* cited by examiner

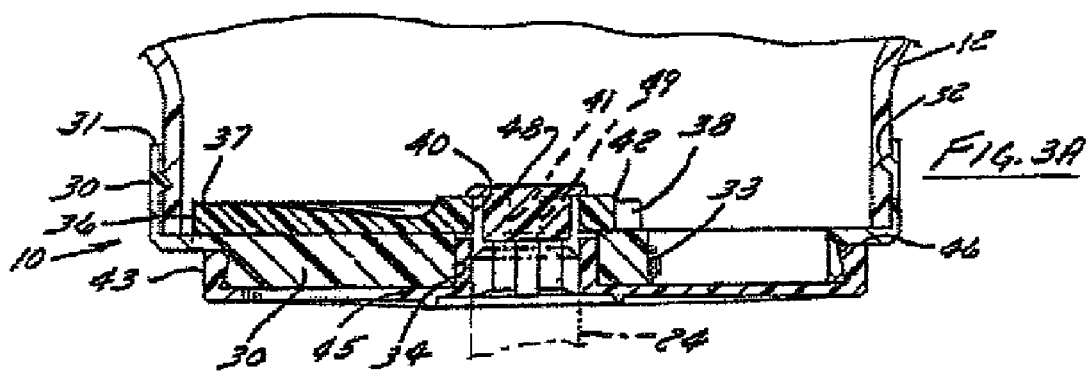
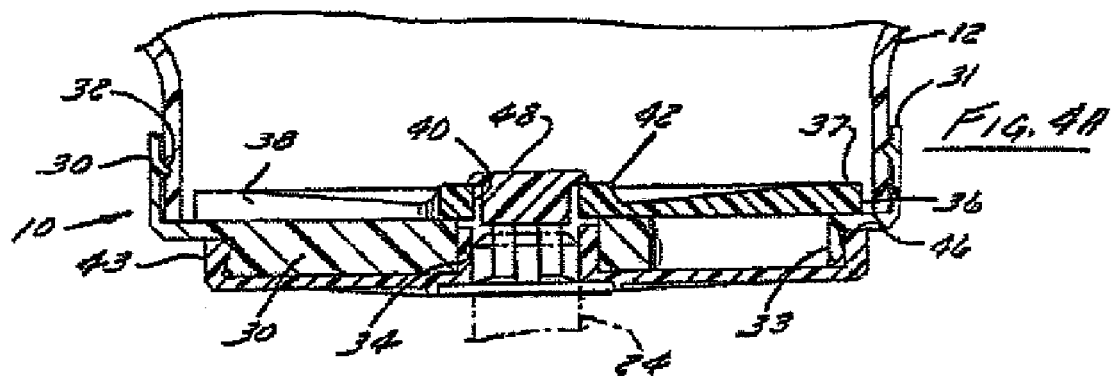
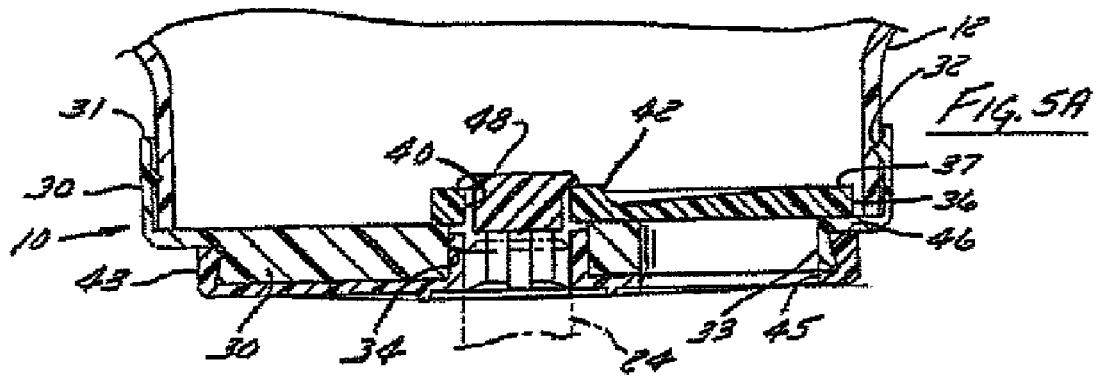

METERING AND DISPENSING CLOSURE

CROSS-REFERENCES TO RELATED APPLICATIONS

This application is a divisional of U.S. patent application Ser. No. 11/404,518, filed on Apr. 14, 2006, which is a Continuation-In-Part of U.S. patent application Ser. No. 10/709,449 filed May 6, 2004, which is U.S. Pat. No. 7,090,098, Issued on Aug. 15, 2006.

BACKGROUND

The field of the invention is metering and dispensing devices for a powder or granular material. More particularly, it relates to a powder dispensing closure which is connected to a container and can dispense accurate amounts of the powder into a liquid or container.

Dispensers of the type concerned with in this invention are disclosed in U.S. Pat. Nos. 4,032,050 and 5,469,992. Both of these dispensers disclose a rotatable metering disk (80 and 20, respectively) for materials to be dispensed. There are problems with a rotatable measuring piece and stationary feed pieces. These cannot effect a desired internal stirring action of the container contents. Without this action, a significant amount of powder can be left in the container and not deposited into the measuring chamber.

The prior art does not provide a metering and dispensing closure which is connectable to a container and affords suitable sealing for powder materials which are hygroscopic.

Currently, the only reliable and cost effective method for dispensing powdered chemicals from small containers (between 1 and 4 kg), is to use a water spray and screen approach. There are two important limitations with these systems; the feed-rate is very inconsistent, and the powder formulations are limited. Such a method is described in U.S. Pat. No. 5,007,559.

The feed-rate varies over at least a 3:1 range and sometimes more due to the amount of powder remaining in the container, any bridging that may occur due to solidification near the screen, water pressure, spray pattern variation, water temperature and batch to batch variations. To control the amount of product dispensed, these systems typically require a concentration feedback control sub-system to compensate for their variable feed-rates. By far the most common is the conductivity feedback control used in dishwashing applications. Stated another way, because of the feed-rate variation, "spray/screen" powder dispensing systems normally can not be used in applications where a repeatable dose is required. This invention avoids this limitation by providing a precise and consistent metered dose based on a volumetric measurement.

The "spray/screen" dispensers work only with a limited range of powders and formulations. Detergents, the most commonly fed powders, are limited to formulations that will not create excess exothermic heat if the spray should penetrate into the powder. This has typically meant that the caustic (typically NAOH or KOH) level needs to be kept below about 40% to prevent the possibility of steam generation within the container which can be a safety issue. The metering and dispensing closure of this invention would remove this limitation and allow more powerful detergent powders to be formulated with perhaps up to 70% caustic concentrations for soft-water dishwasher applications. This would represent a 40% to 50% increase in "power" in a single container.

Many powders simply cannot be fed at all using the "spray/screen" method. These include any powders that tend to absorb water quickly and turn into a gel before they can be dissolved at the screen. The metering and dispensing closure of this invention obviates this.

SUMMARY OF THE INVENTION

The shortcomings of the prior art are overcome by the metering and dispensing closure for a container of this invention which includes a container cap member attachable to the container. The container cap member has a first side adapted to be mounted facing an inside of the container and a second side adapted to be mounted facing an outside of the container. A rotor is mounted on each side of the cap to selectively open and close an aperture in the cap member.

In one embodiment, a measuring chamber is positioned in the container cap member. There is a first rotatable disk member having at least one passage which is mounted on the first side of the container cap member. There is also a second rotatable disk member having a passage therein which is mounted on the second side of the container cap member. When the disk members are rotated, powder material passes sequentially through the one passage in the first disk member, into the measuring chamber of the cap member and then through the passage of the second disk.

In one aspect, the first and second rotatable disk members are connected to each other.

In another aspect, the second rotatable disk member includes a drive shaft engagement portion.

In yet another aspect, the second rotatable disk member includes a gear for engagement by a complementary gear of a drive gear.

In a preferred embodiment, the cap member includes threads for attachment to complementary threads of the container.

In another preferred embodiment, there is provided a powder dispensing apparatus which includes a container cap member attachable to the container, the container cap member having a first side adapted to be mounted facing an inside of the container and a second side adapted to be mounted facing an outside of the container. A measuring chamber positioned in the container cap member.

There is a first rotatable disk member having at least one passage therein, the first rotatable disk member mounted on the first side of the container cap member. A second rotatable disk member has a passage therein with the second rotatable disk member mounted on the second side of the container cap member, the first and second rotatable disk members connected to each other with the second rotatable disk member including a drive shaft engagement portion. There is also a drive shaft connected to the drive shaft engagement portion and a drive member connected to the drive shaft.

When the disk members are rotated, powder material passes sequentially through the one passage in the first disk member, into the measuring chamber of the cap member, and then through the passage of the second disk.

Some embodiments of the invention are directed to a dispensing closure for a container. The dispensing closure comprising a cap adapted to be received on the container and a first and second movable member coupled to the cap. The cap has an inside face, an outside face, and an aperture extending from the inside face to the outside face through the cap to allow materials within the container to be dispensed. The first movable member is positioned adjacent the inside face of the cap to selectively block the aperture in the cap. The first movable member is movable between a first position in which the aperture is blocked and a second position in which the aperture is not blocked. The second movable member positioned adjacent the outside face of the cap to selectively block the aperture in the cap. The second moveable member is movable between a first position in which the aperture is blocked and a second position in which the aperture is not blocked. Movement of the first moveable member and the second moveable member is sequenced such that at least one of the moveable members is always blocking the aperture.

In some embodiments, a plurality of resilient fingers are coupled to the first movable member and extend from the first movable member toward the cap. The fingers are movable with the first movable member between a position in which the fingers are not aligned with the aperture and a position in which the fingers are aligned with the aperture. The resilient fingers extend into the aperture of the cap when the fingers are in the aligned position. In some embodiments, the fingers are aligned with the aperture in the cap when the first movable member is in a position that blocks the aperture and the second movable member is in a position in which the aperture is not blocked. Additionally, when the fingers are not aligned with the aperture in the cap, the fingers contact the cap and are biased by cap towards a bent over position, and when the fingers are aligned with the aperture in the cap, the fingers resiliently return to a substantially unbiased position and extend into aperture. In some embodiments, the fingers are positioned within a recessed portion of the first movable member, the recessed portion extending away from the cap.

In some embodiments, the movable members can be rotors or disks that rotate between the first and second position. Further, depending upon the configuration of the moveable members can have a passage defined in them, wherein rotation of the first and second movable members selectively and sequentially place the first and second passages in communication with the aperture. As such, the first passage can be rotatably offset relative to the second passage.

In some embodiments, the second movable member comprises an edge that contacts and passes over the aperture in the cap when the second movable member moves from the second position back to the first position. The edge comprises a generally angled surface terminating at a point defining an acute angle. This edge can be used to scrape or otherwise remove cake, stuck, or otherwise encrusted materials from the cap. In some embodiments, the generally angled surface of the edge includes a concave portion.

Some embodiments of the closure also include a hook-liked member extending from the first movable member adjacent the cap. The hook-liked member is configured to drive granular or powdered materials contacted by the hook-like members toward the center of the cap.

In some embodiments, the cap and first moveable member have a substantially concave shape. This shape can help to substantially fully deplete dispensable materials from a container. In some embodiments, the second movable member also has a substantially concave shape.

Some embodiments of the invention are directed toward a dispensing apparatus. The dispensing apparatus comprising a frame, a funnel coupled to the frame and supported to rotate relative to the frame, and a drive member coupled to the frame and the funnel, the drive member actuatable to rotate the funnel relative to the frame. The dispensing apparatus can also include a conduit in fluid communication with a water source and the funnel. The dispensing apparatus dispenses a container containing a granular or powdered material and having a closure that selectively dispenses the material from the container via rotation of at least a portion of the closure. The container and closure are supported by the frame and positioned adjacent the funnel. The closure and funnel are in rotational engagement such that rotation of the funnel causes rotation of at least a portion of the closure. The closure dispenses the materials located in the container into the funnel.

In some embodiments, the closure comprises a cap adapted to be received on the container and a first and second rotor positioned on opposite sides of the cap. The cap has an inside face, an outside face, and an aperture extending from the inside face to the outside face through the cap to allow materials within the container to be dispensed. The first rotor is positioned adjacent the inside face of the cap to selectively block the aperture in the cap. The first rotor is movable between a first position in which the aperture is blocked and a second position in which the aperture is not blocked. The second rotor is positioned adjacent the outside face of the cap to selectively block the aperture in the cap. The second rotor is movable between a first position in which the aperture is blocked and a second position in which the aperture is not blocked. Movement of the first rotor and the second rotor is sequenced such that at least one of the rotors is always blocking the aperture. In some embodiments, the second rotor includes a projecting member that extends toward the funnel and engages a portion of the funnel, wherein the engagement of the projecting member with the funnel provides a driving engagement between the funnel and the second rotor. Additionally, the funnel includes a projecting member that extends toward the second rotor and engages the projecting member on the second rotor.

In some embodiments, the drive member comprises a motor and a transmission assembly extending between the funnel and the motor. The transmission assembly can include a belt extending between the motor and the funnel, a gear train, and other known transmission configurations.

Some embodiments of the invention are directed toward a method of dispensing a powder or granular material from a container. The method can include providing a dispensing assembly discussed above, actuating the drive member, and rotating funnel via actuation of the drive member. The method further includes engaging a portion of the closure with the funnel, and rotating at least a portion of the closure via the rotation of the funnel. The method also includes dispensing the powdered or granular material from the container and through the closure and into the funnel via rotation of at least a portion of the closure. The method of dispensing a powdered or granular material from a container can also include drawing water from the water source and through the conduit to the funnel, and flushing the powdered or granular material from the funnel with the water.

Another embodiment of the invention is directed toward a method of dispensing a powder or granular material from a container. The method includes providing a dispensing assembly described herein and dispensing the powdered or granular material from a container and through a closure and into a funnel via rotation of at least a portion of the closure. The method also includes drawing water from a water source and through a conduit to the funnel, actuating a drive member, rotating funnel via actuation of the drive member; and flushing the powdered or granular material from the funnel with the water while rotating the funnel.

Some embodiments of the invention are directed toward a system for dispensing a powder or granulated product having greater than 40% caustic. The dispensing assembly comprising a distributable container having an opening and containing the powder or granulated product having greater than 40% caustic, a closure coupled to the distributable container, and a dispenser fixed at a dispensing location adapted to receive the closure of the container and selectively operate the closure to dispense the powder or granulated product having greater than 40% caustic. The closure is configured to prevent moisture from entering the container and contacting the powder or granulated product having greater than 40% caustic. The closure comprises a cap, a first rotor, and a second rotor. The cap is adapted to fit over and secure the opening of the distributable container. The cap has a central axis and an opening therein positioned off-center from the central axis. The cap also has an inner surface and an outer surface. The first rotor is coupled to the inside of the cap and positioned to rotate about the central axis of the cap. The first rotor is rotatable between a position in which it blocks the opening of the cap and a position in which it does not block the opening of the cap. The second rotor is coupled to the outside of the cap and positioned to rotate about the central axis of the cap. The second rotor is rotatable between a position in which it blocks the opening in the cap and a position in which it does not block the opening of the cap. The rotation of the first rotor and the second rotor is sequenced such that at least one of the rotors always block the opening in the cap to prevent moisture from entering the container and contacting the powder or granulated product having greater than 40% caustic. The dispenser is fixed at a dispensing location and is adapted to receive the closure of the container. The dispenser selectively operates the closure to dispense the powder or granulated product having greater than 40% caustic. In some embodiments, a power source is operatively coupled to the dispenser and adapted to rotate the rotors relative to the cap when the closure is mated to the dispenser thereby rotate the first rotor between the first position and the second position of the first rotor and thereby rotate the second rotor between the first position and the second position of the second rotor to allow for dispensing of the powder or granulated product having greater than 40% caustic from the distributable container to the dispenser.

A general object of the invention is to provide an improved dispensing device for a powder or granular material.

Another object is a powder dispensing device which can provide a seal for the powder being dispensed.

Still another object is a dispensing device of the foregoing type which is easily connected to a container.

Yet another object is a dispensing device of the foregoing type which can be driven by a variety of drive means.

Still yet another object is a dispensing device of the foregoing type which can accurately measure a powder or granular material being dispensed.

Further objects, advantages, and/or aspects of the present invention, together with the organization and operation thereof, will become apparent from the following detailed description of the invention when taken in conjunction with the accompanying drawings.

BRIEF DESCRIPTION OF THE DRAWINGS

FIG. 2 is an assembly view of the component parts of the dispensing apparatus.

FIGS. 3A, 4A and 5A are views taken along lines 3A-3A, 4A-4A, and 5A-5A of FIGS. 3, 4 and 5, respectively.

Figure 1:
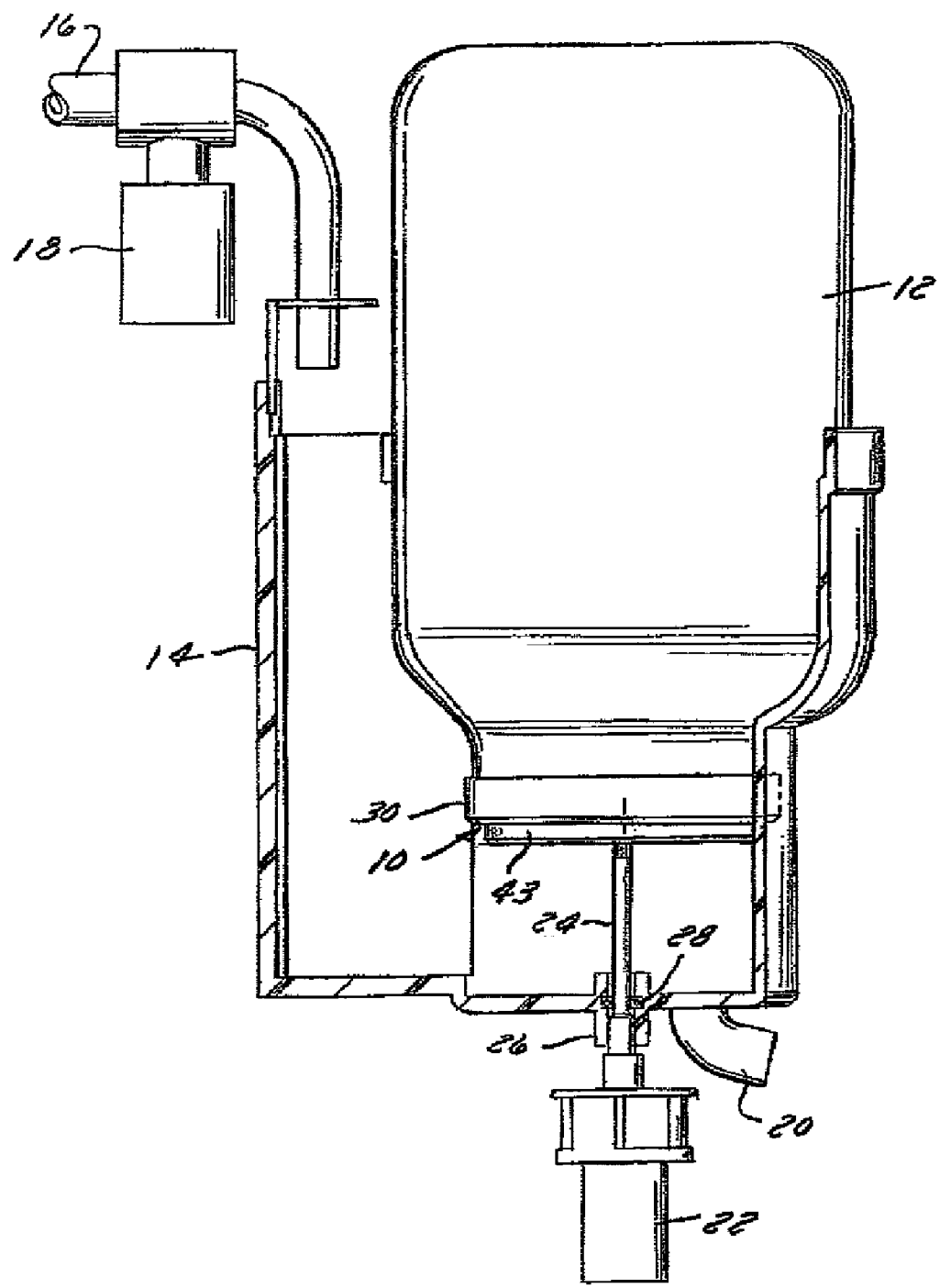
FIG. 1 is a side elevation view and in partial section showing the powder dispensing apparatus of this invention in conjunction with a receptacle.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of "including," "comprising," or "having" and variations thereof herein is meant to encompass the items listed thereafter and equivalents thereof as well as additional items. The terms "mounted," "connected," and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Finally, as described in subsequent paragraphs, the specific mechanical configurations illustrated in the drawings are intended to exemplify embodiments of the invention. Accordingly, other alternative mechanical configurations are possible, and fall within the spirit and scope of the present invention.

DESCRIPTION OF THE ILLUSTRATED EMBODIMENTS

Referring to FIGS. 1-5, the metering and dispensing closure generally 10 is shown in conjunction with a container 12 supported in a dispenser assembly or receptacle 14 for housing the closure 10. A water intake conduit 16 controlled by solenoid valve 18 is utilized to introduce water into the dispenser assembly or receptacle 14. A water solution outlet conduit 20 is also in communication with the dispenser assembly or receptacle 14. A drive member 22 drives a drive shaft 24, the drive shaft being journalled in the collar 26 with a seal 28.

Referring to FIG. 2, it is seen that the metering and dispensing closure generally 10 is composed of three basic components. There is a cap member 30 with an upstanding wall 31 and internal threads 32 for engaging complementary threads on the container 12. There is also a rotatable disk 36 with a raised peripheral wall 37 as well as a cutaway portion 38. Rotatable disk 36 is seated inside the cap member 30. The third component is a rotatable disk 43 with a raised peripheral wall 46 and a stub shaft 48 with projections 49. These fit through an opening 34 in the cap member 30 in a manner that the projections 49 engage slots 41 in the rotatable disk 36. Rotatable disks 36 and 43 are rotated by the shaft 24 connected to the stub shaft 48.

The metering and dispensing closures or embodiments 10A, 10B, 10C and 10D shown in FIGS. 6, 7, 9, and 11, respectively, employ some of the same basic components as previously described for embodiment 10, except they have an A, B, C or D suffix.

Embodiment 10A illustrates two dispensing closures for the container 12A as well as two drive motors 60A for the drive shafts 24A. The drive shafts 24A rotate the rotatable disk 43A as well as an internal rotatable disk 36A not shown.

Figure 7:
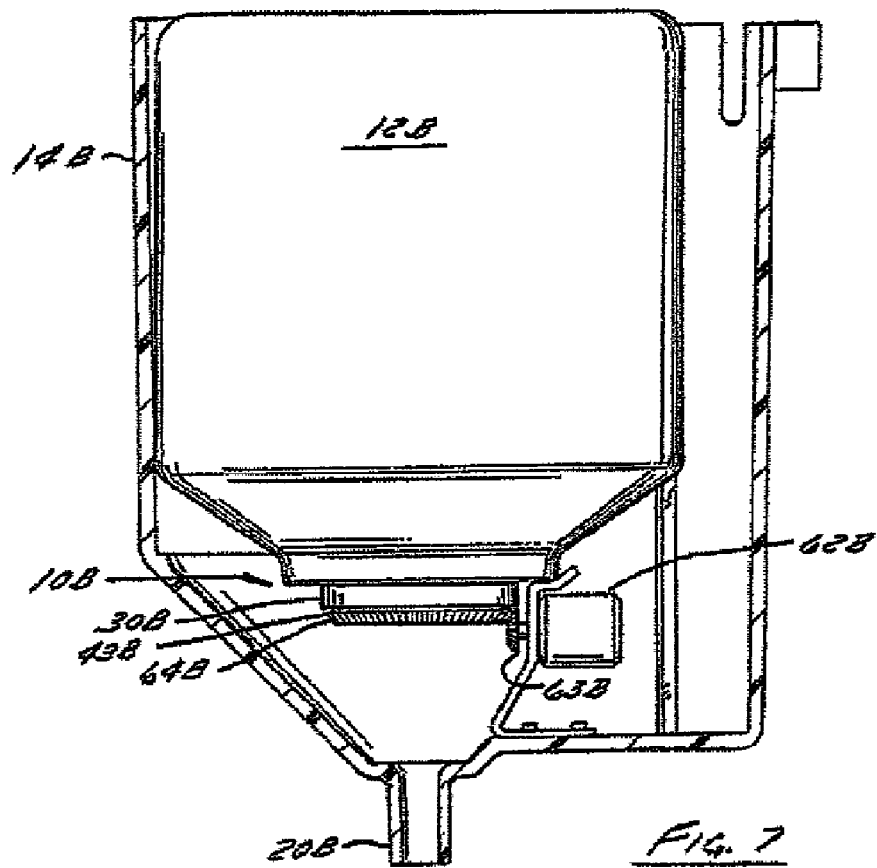
FIG. 7 is a view similar to FIG. 1 showing another embodiment.
Figure 8:
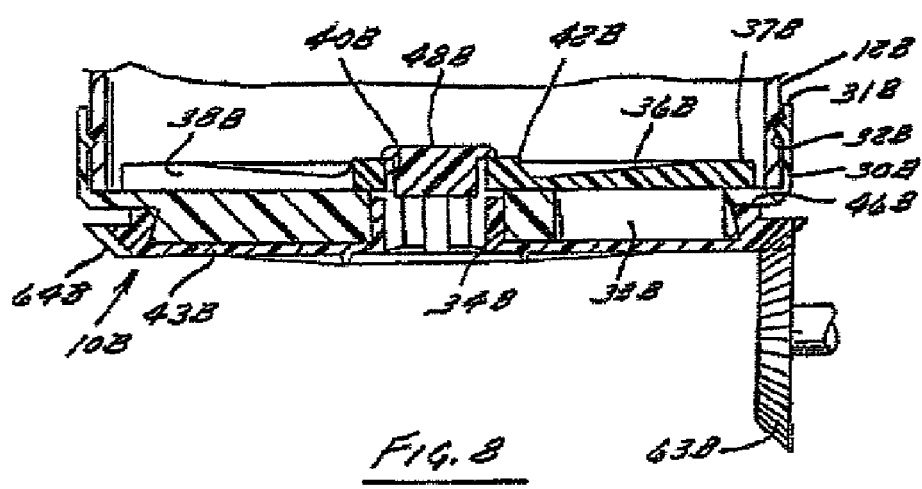
FIG. 8 is a partial view in section illustrating a drive mechanism for the FIG. 7 embodiment.

Embodiment 10B shown in FIGS. 7 and 8 differs from that shown for 10 in that it has a different drive mechanism for rotating rotatable disks 43B and 36B. This is accomplished by the motor 62B and the drive gear 63B which engages the ring gear MB on the rotatable disk 43B. Rotation of disk 36B is effected by the stub shaft 48B connected to rotatable disks 43B and 36B. Another difference is the location of the water outlet conduit 20B directly beneath the metering and dispensing closure 10B. The interaction of the previously described components is seen in FIG. 8.

Figure 9:
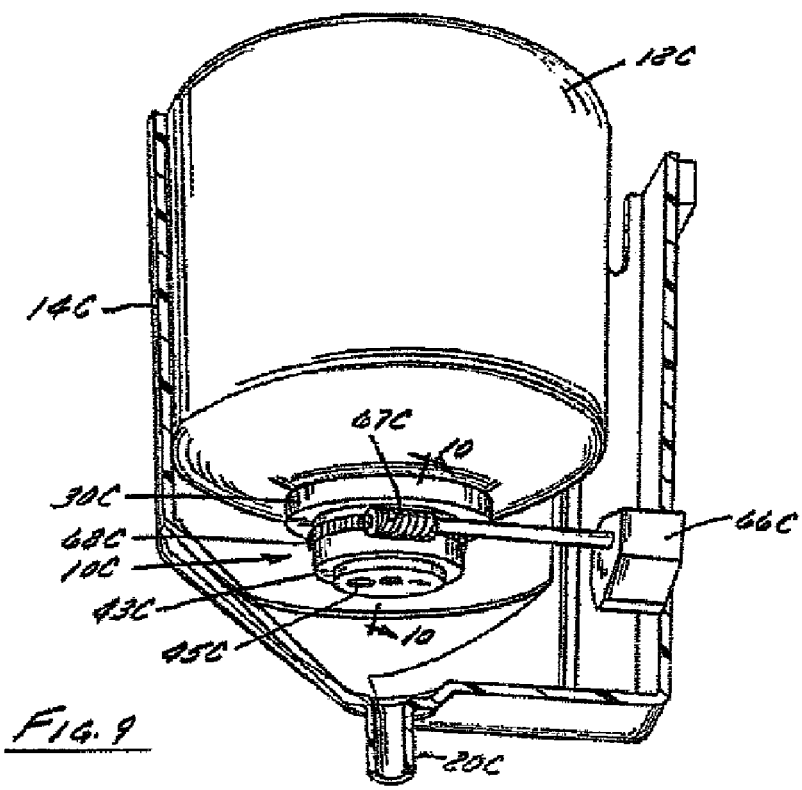
FIG. 9 is a view similar to FIG. 7 showing yet another embodiment.
Figure 10:
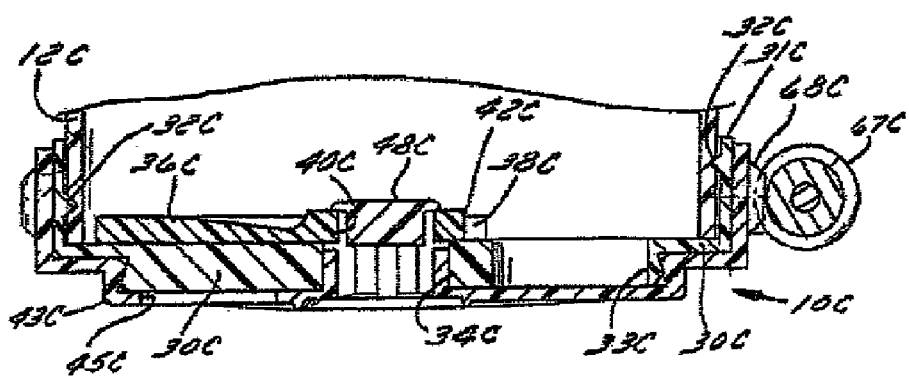
FIG. 10 is a view taken along line 10-10 of FIG. 9 showing the drive mechanism.

The FIG. 9 10C embodiment is similar to that of the 10B embodiment shown in FIG. 7, but includes a motor 62C connected to worm drive gear 63C for driving the ring gear 64C on the rotatable disk 43C. Stub shaft 48B is interconnected with disks 43C and 36C to provide rotation thereof. The positioning of the rotatable disks 36C and 43C with respect to the cap member 30C is illustrated in FIG. 10.

Figure 6:
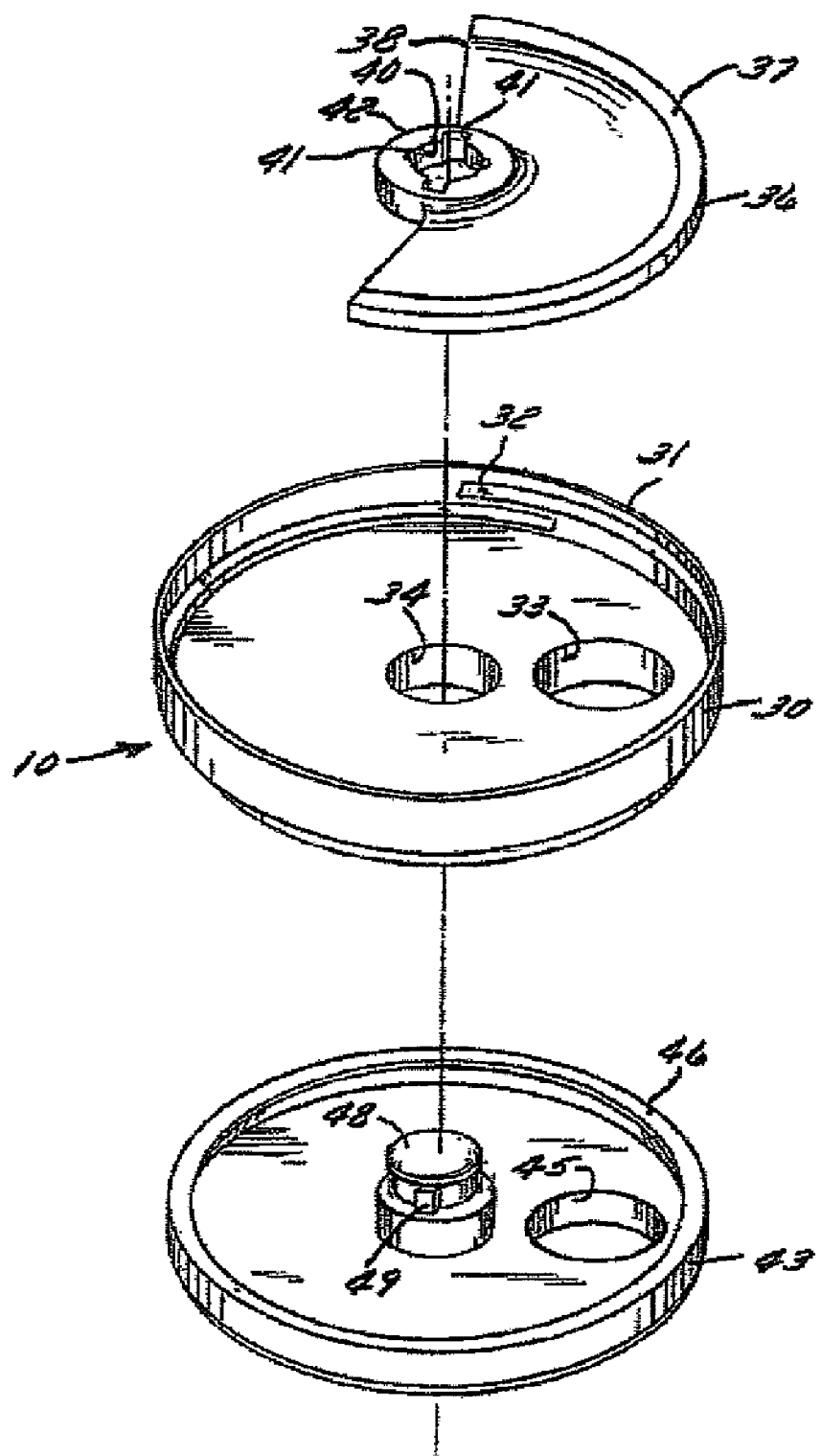
FIG. 6 is a perspective view of another embodiment of the dispensing apparatus in conjunction with a receptacle.
Figure 11:
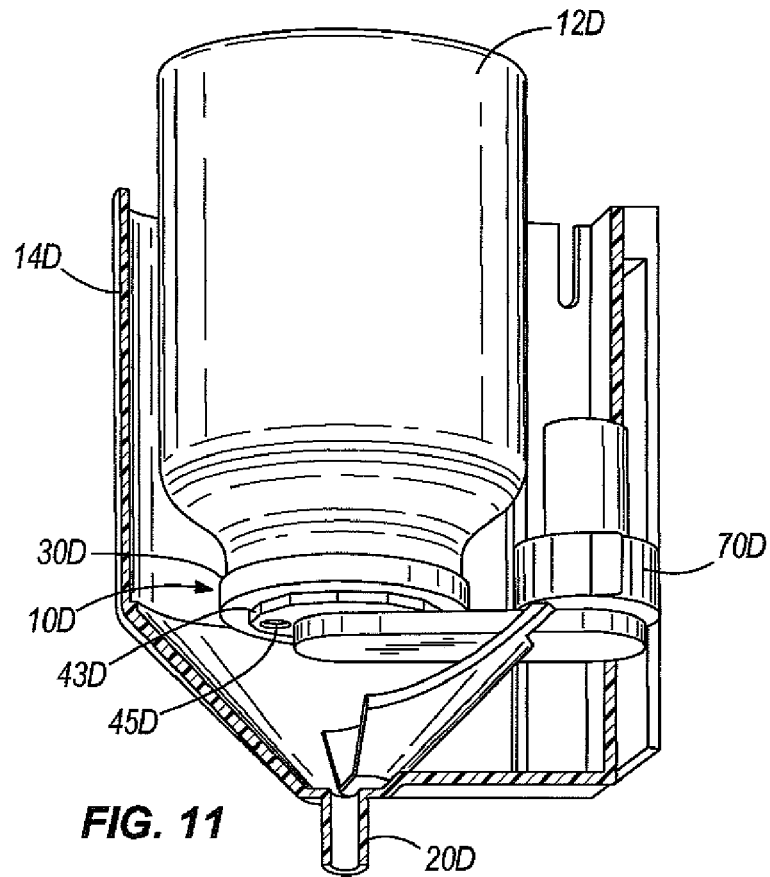
FIG. 11 is a view similar to FIG. 1 showing still another embodiment.
Figure 12:
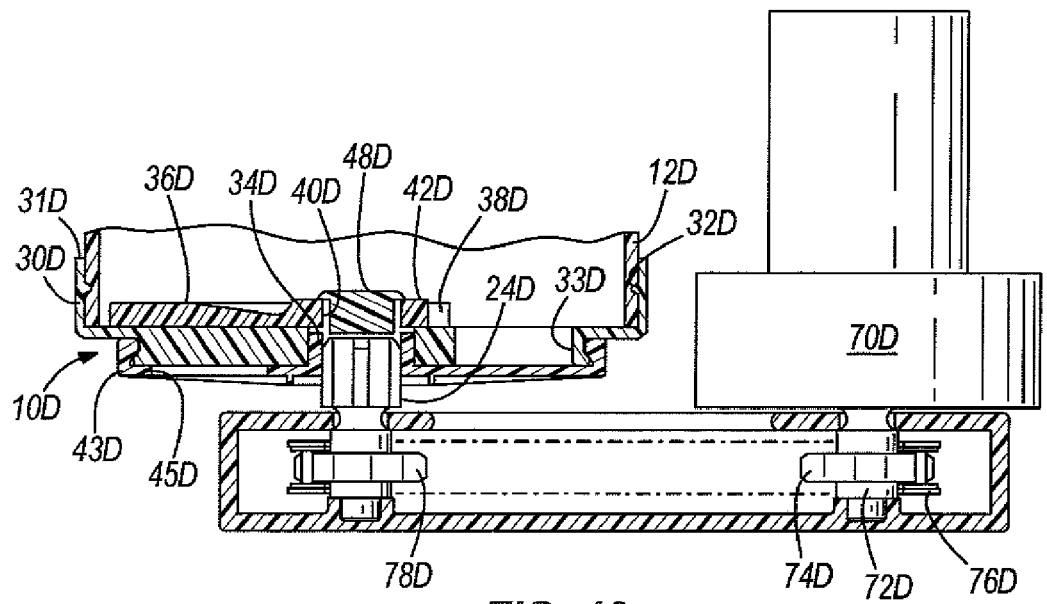
FIG. 12 is a view illustrating the drive mechanism for the FIG. 11 embodiment.

The embodiment 10D shown in FIG. 11 differs from the embodiments shown in FIGS. 6, 7 and 9 in that yet another means for rotating the disks 43D and 36D is illustrated. In this embodiment, a motor 60D drives the drive shaft 71D having the sprocket 74D for engaging a chain 75D which in turn drives the sprocket 78D on the drive shaft 24D. Drive shaft 24D effects rotation of stub shaft 48D and accordingly disks 43D and 36D.

Figure 3:
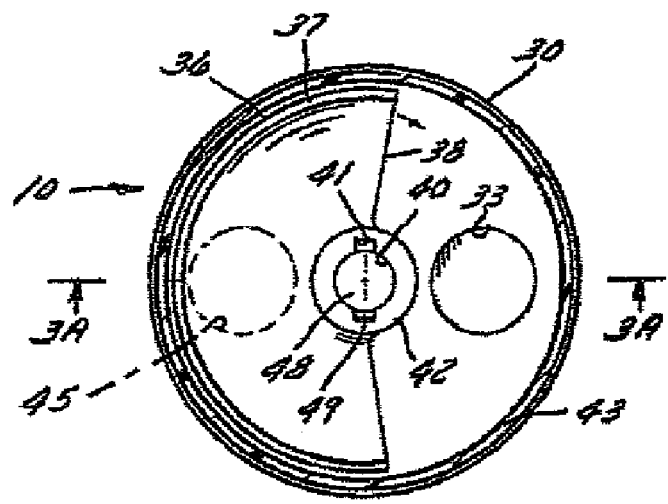
FIG. 3 is a top view of the dispensing apparatus in a first position.
Figure 4:
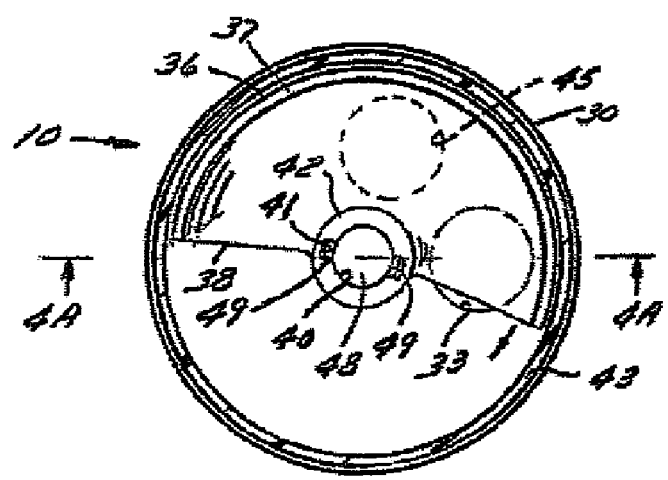
FIG. 4 is a view similar to FIG. 3 showing the dispensing apparatus in a second position.
Figure 5:
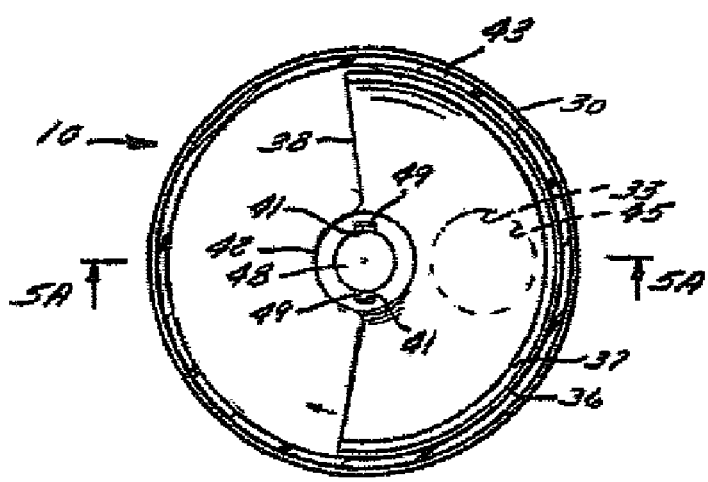
FIG. 5 is a view similar to FIG. 3 showing the dispensing apparatus in a third position.
Figure 6:
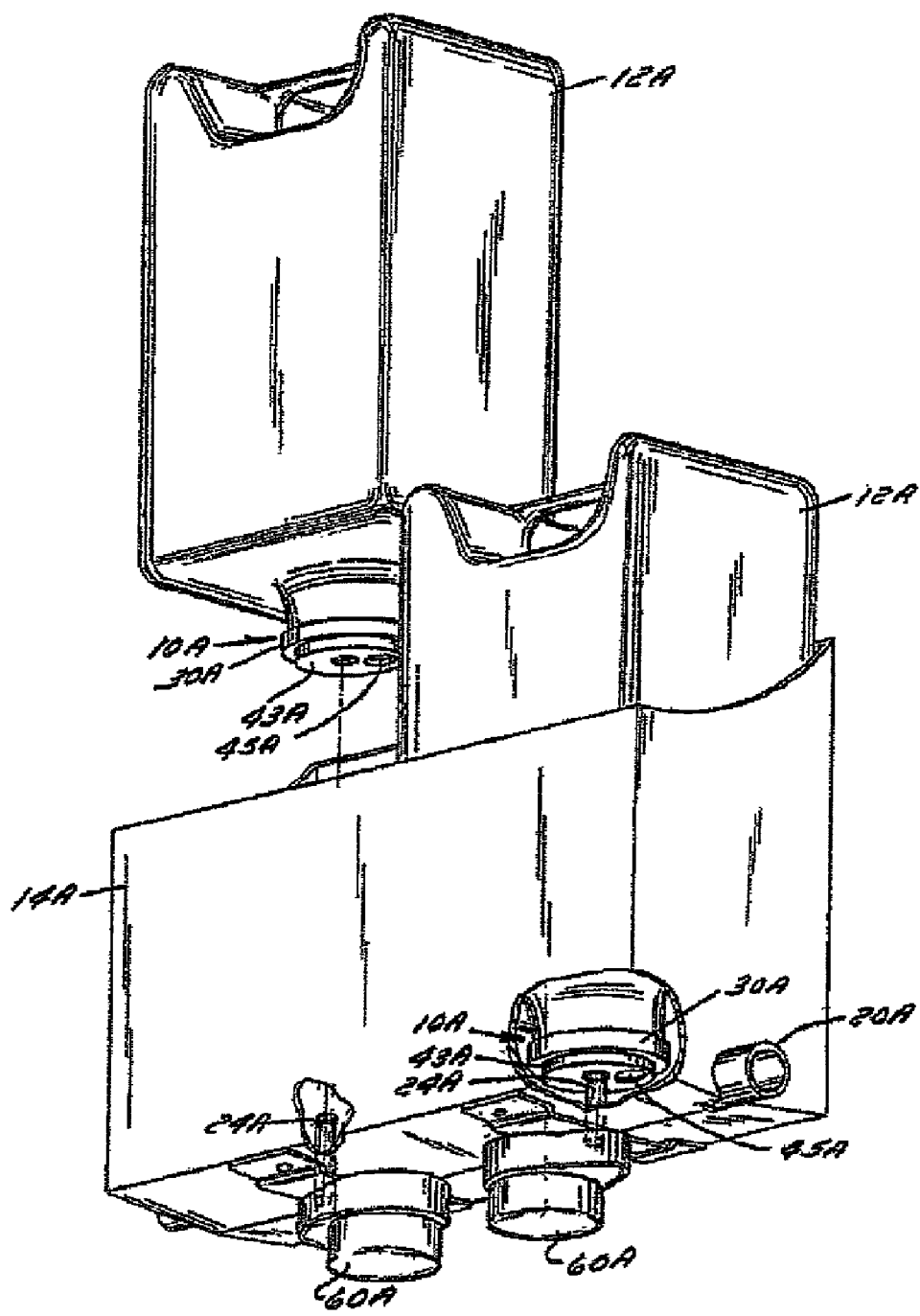

A better understanding of the metering and dispensing device shown in FIGS. 1-5 will be had by a description of its operation. Referring to FIGS. 1 through 5A, and dispensing closure 10, a container 12 with a powdered material is supported in the receptacle 14. Water will be introduced into it through the water intake conduit 16. The metering and dispensing closure 10 is attached to the container 12 with the cap member 30, and rotatable disks 36 and 43 shown in the position in FIGS. 3 and 3A. In this position, powder material is free to enter into the measuring opening or chamber 33 in cap member 30 as it is uncovered by disk 36 and cutaway 38; however, it cannot pass into the receptacle 14 as its passage is blocked by rotatable disk 43, such as by wall 35. Activation of the drive member 22 and rotation of the drive shaft 24 causes the upper rotatable feeder disk 36 and the lower rotatable disk 43 to move to a position shown in FIGS. 4 and 4A. In this position, it is seen that no more powder material can enter the opening 33 which now becomes a measuring chamber. Continued rotation of the disks 36 and 43 positions them as shown in FIGS. 5 and 5A. Here it is seen that opening 33 is now positioned over opening 45 to allow the powdered material to flow into receptacle 14 and be mixed with the water. The mixed material then exits by means of the water outlet solutions conduit 20.

The operation of metering and dispensing closures 10A, 10B, 10C and 10D is substantially the same as described for metering and dispensing closure 10A. The differences are in the use of different drive mechanisms, such as shown by the motors 60A, 62B, 66C and 70D with the described associated drive mechanisms.

An important feature of this embodiment is in the stationary position of the cap member 30 in conjunction with the rotation of the rotatable disks 36 and 43. This feature provides the advantage of accurate depositing of powder material into the measuring opening 33. This is effected by the rotation of the disk 36 which causes a stirring of the powder inside the container 12 and consistent depositing of the powder material into the measuring opening 33. Another advantage in having the cap member 30 remain stationary with respect to disks 36 and 43 is that it can be manufactured more easily.

The dispensing closure of this invention has been described in conjunction with particular configurations of receptacles. It should be understood that any type of receptacle can operate in conjunction with this dispensing closure. They do not necessary have to have a receptacle that contains water. For example, they could be utilized in a receptacle and supported therein where the powder material would drop into another container having a liquid predisposed therein. Neither is it necessary that the dispensing closure be employed in conjunction with a receptacle employed with water. Other liquids such as water miscible and immiscible solvents including water and ether could be employed.

The preferred material for manufacturing cap member 30 and disks 36 and 43 is polypropylene. However, other chemical resistant resinous plastic materials can be employed such as polyethylene or Teflon®. If desired, a lubricant can be added to the plastic materials.

Referring to FIGS. 13-30, additional embodiments of the dispensing assembly 14 and the metering and dispensing closure 10 are shown. The dispensing assembly 14 of this embodiment has many features in common with the embodiments discussed above. Accordingly, such features will be given a common number. Similarly, the dispensing closure 10 also has similar features to the dispensing closures 10 discussed above and will follow the numbering scheme discussed above.

Figure 13:
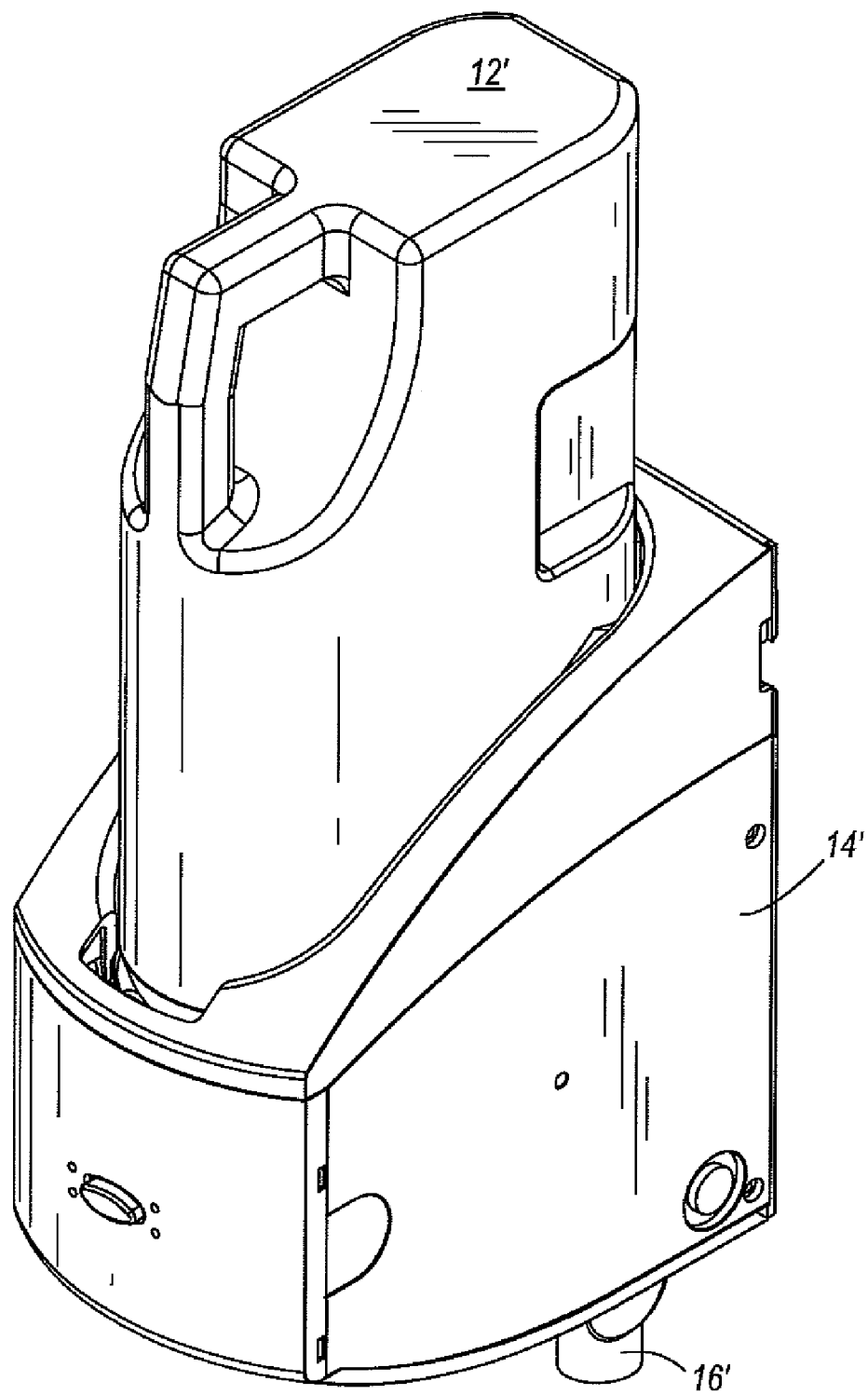
FIG. 13 is a perspective view of still another embodiment of a dispensing assembly embodying inventive aspects and container having a closure embodying inventive aspects.
Figure 14:
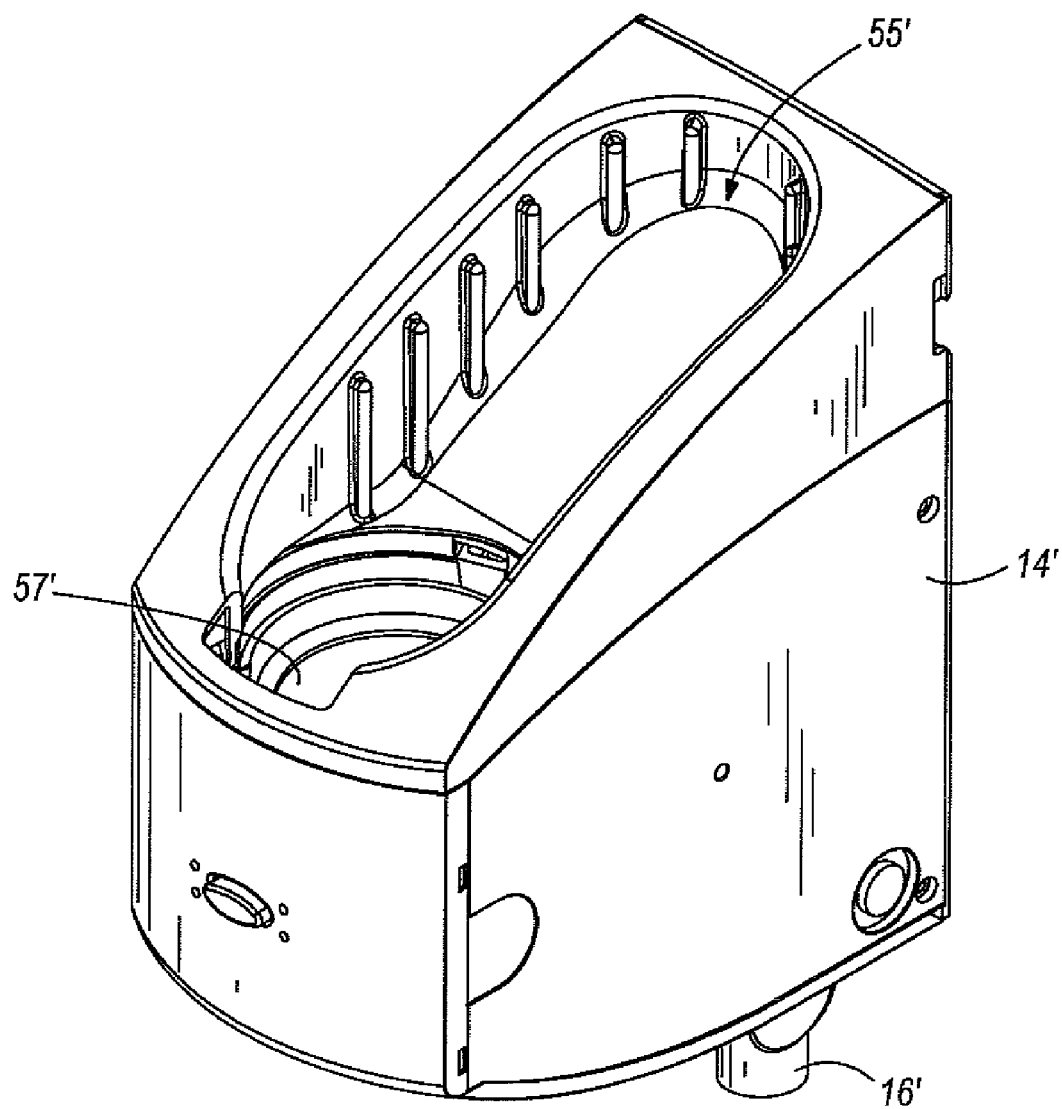
FIG. 14 is a perspective view of the dispenser shown in FIG. 13.
Figure 15:
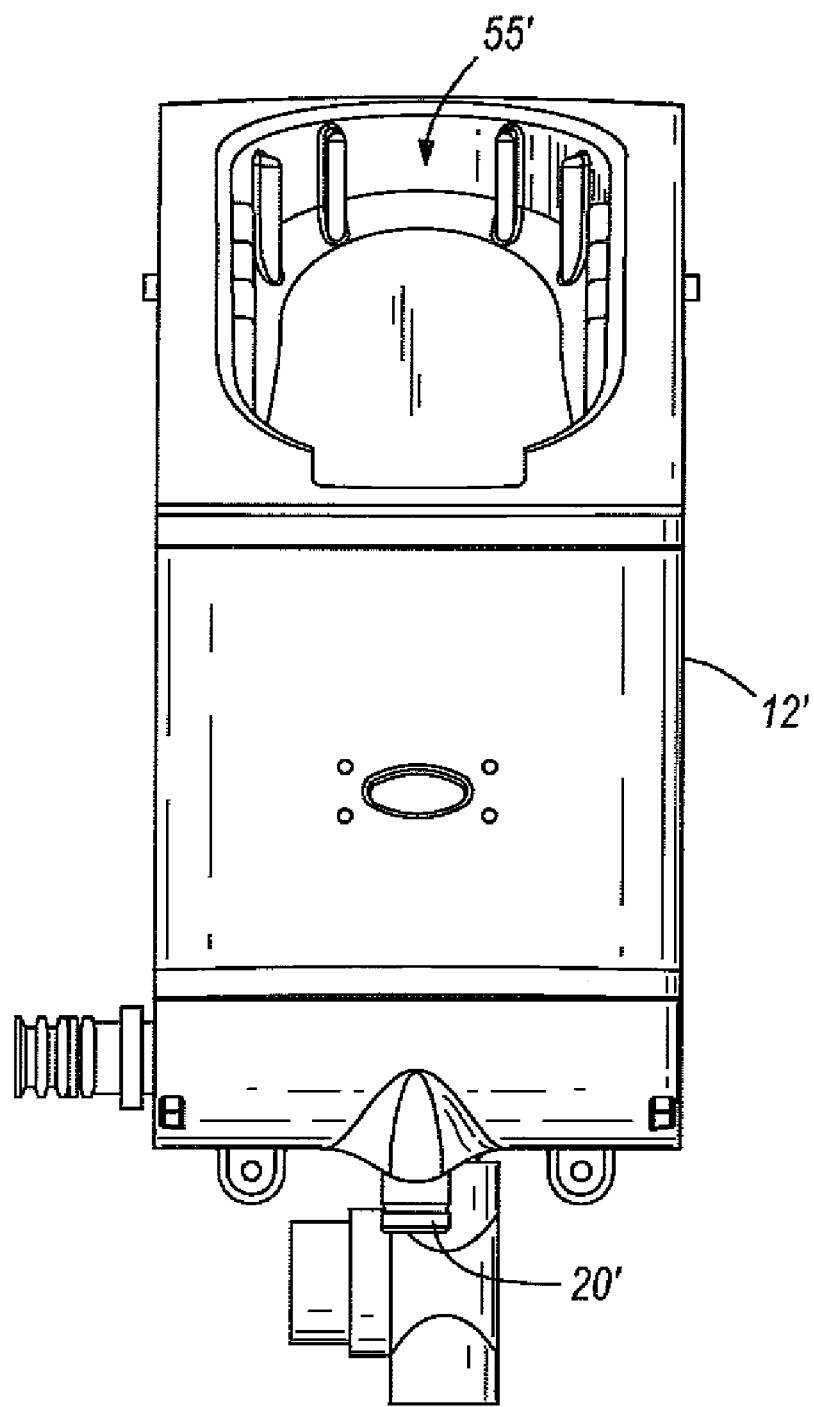
FIG. 15 is a front view of the dispenser shown in FIG. 13.
Figure 16:
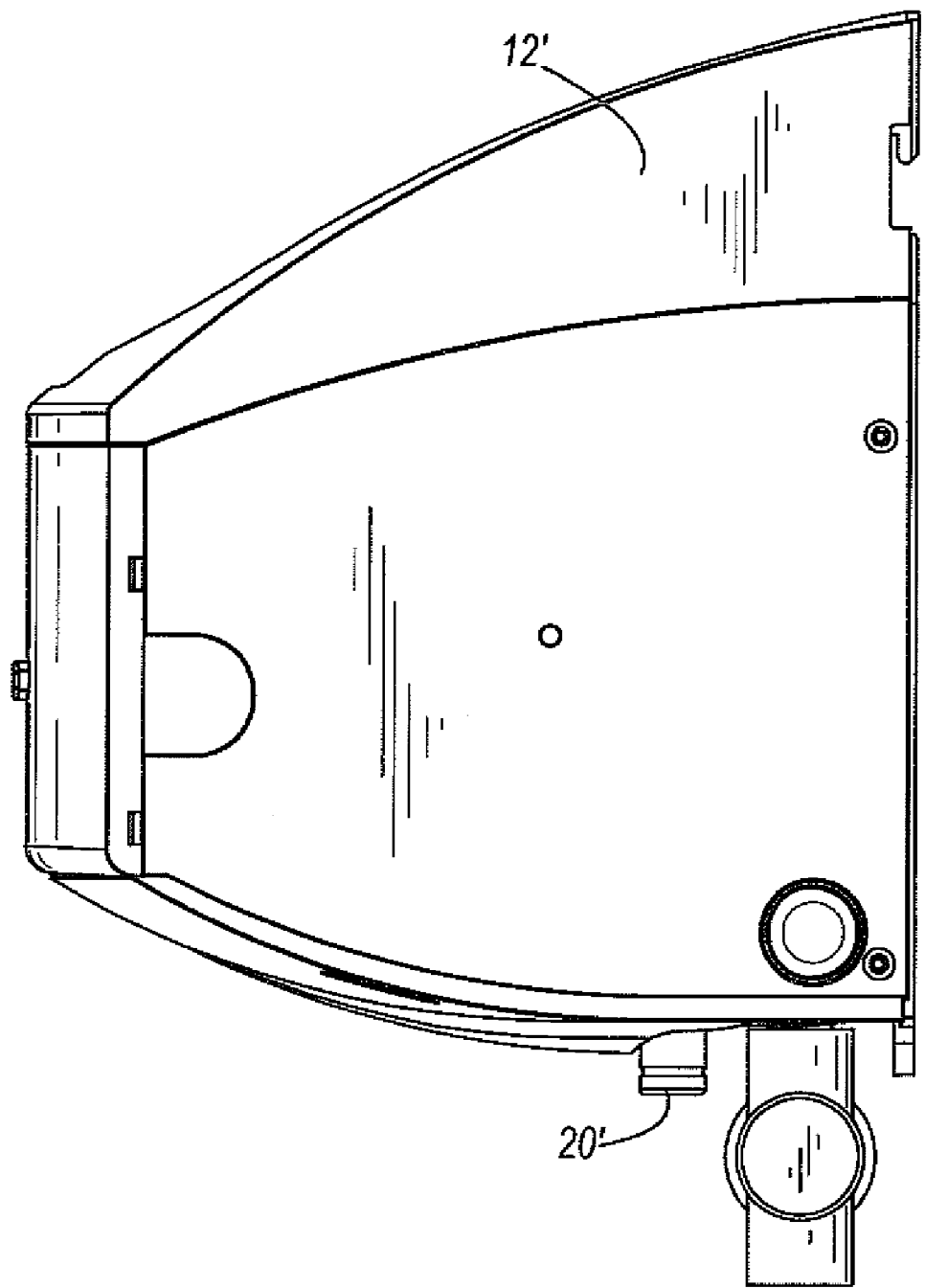
FIG. 16 is a side view of the dispenser shown in FIG. 13.
Figure 17:
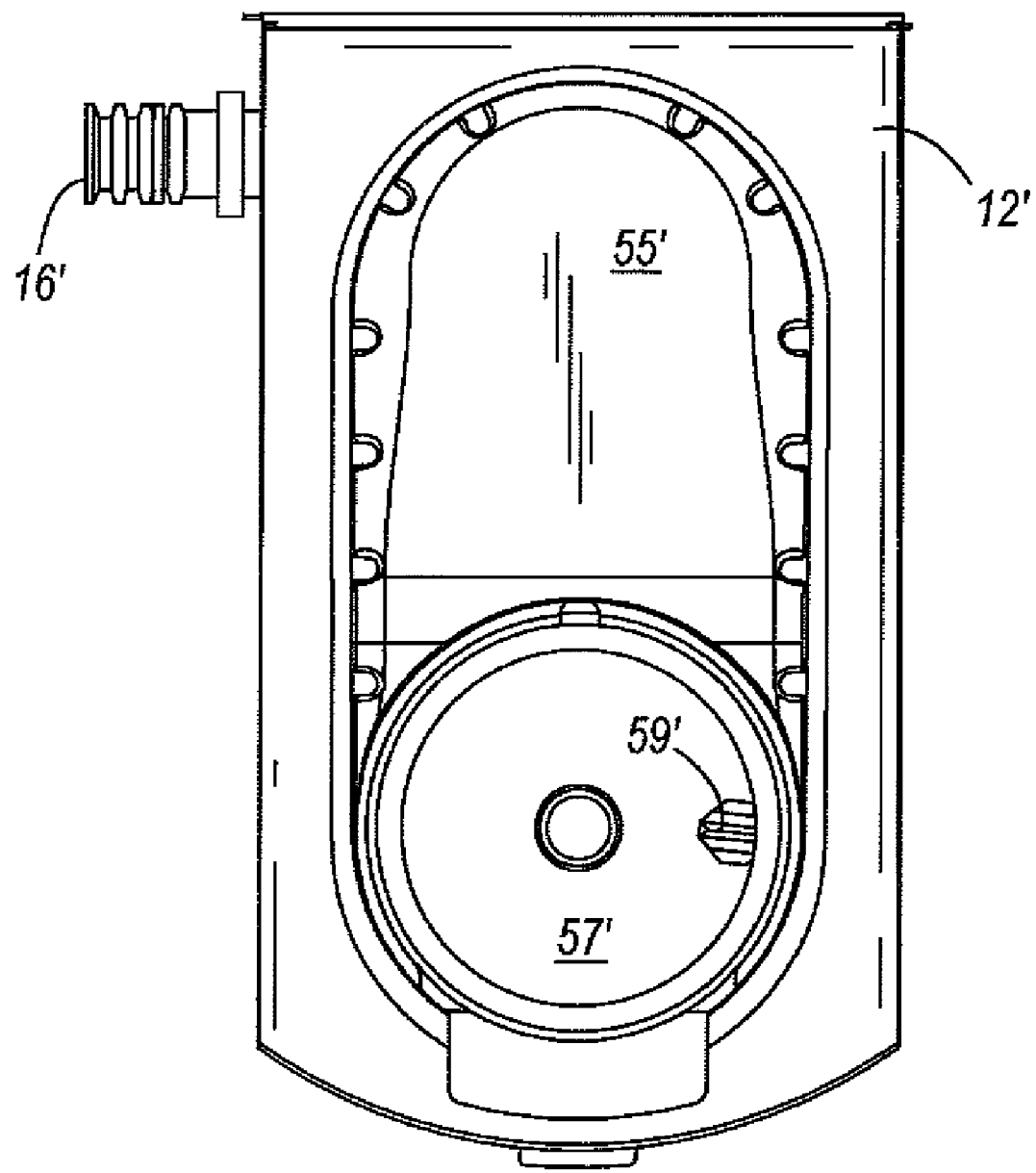
FIG. 17 is a top view of the dispenser shown in FIG. 13.
Figure 18:
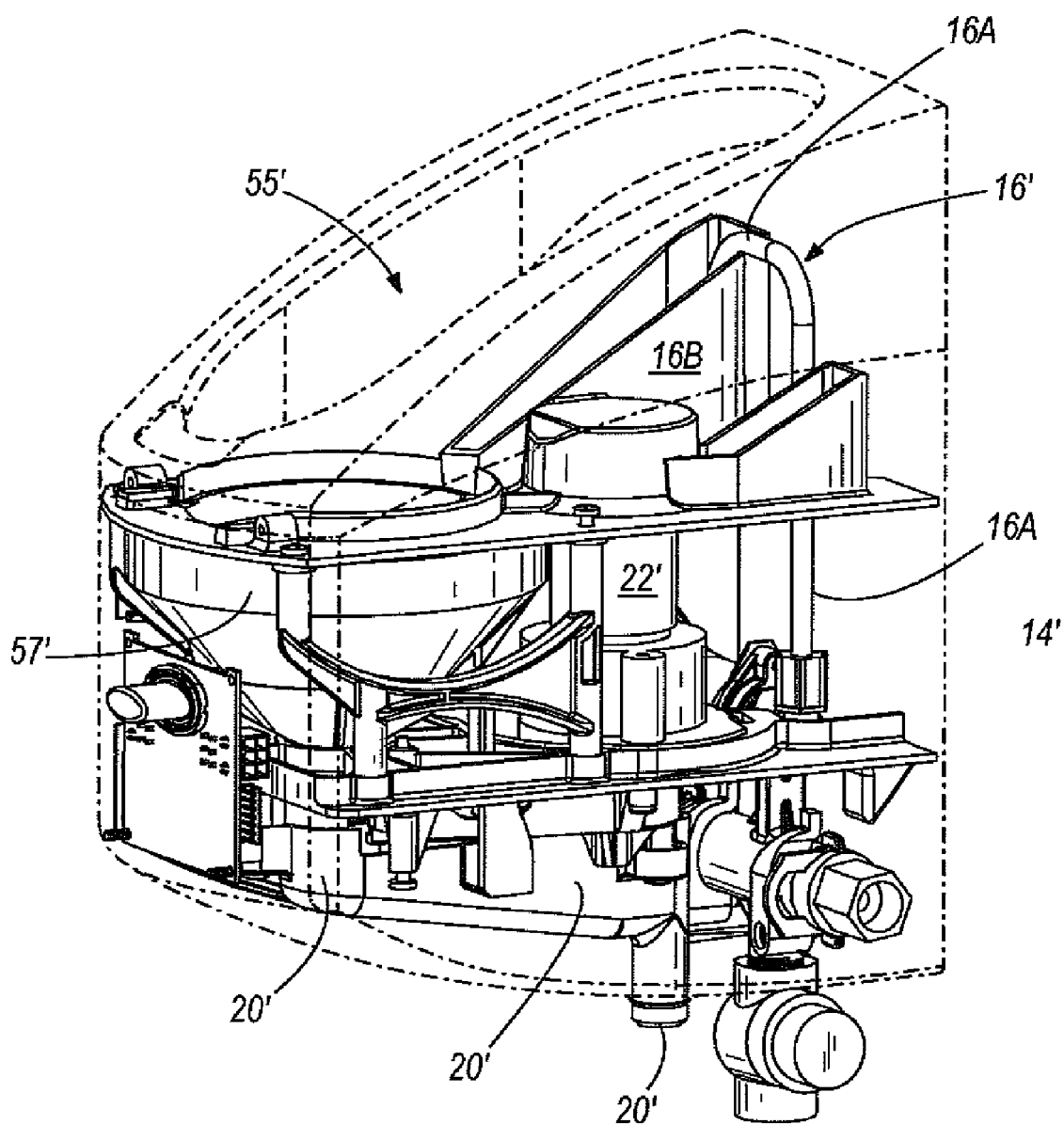
FIG. 18 is a perspective view of the dispenser shown in FIG. 13 wherein the housing of the dispenser is shown in phantom to reveal certain subassemblies of the dispenser.
Figure 19:
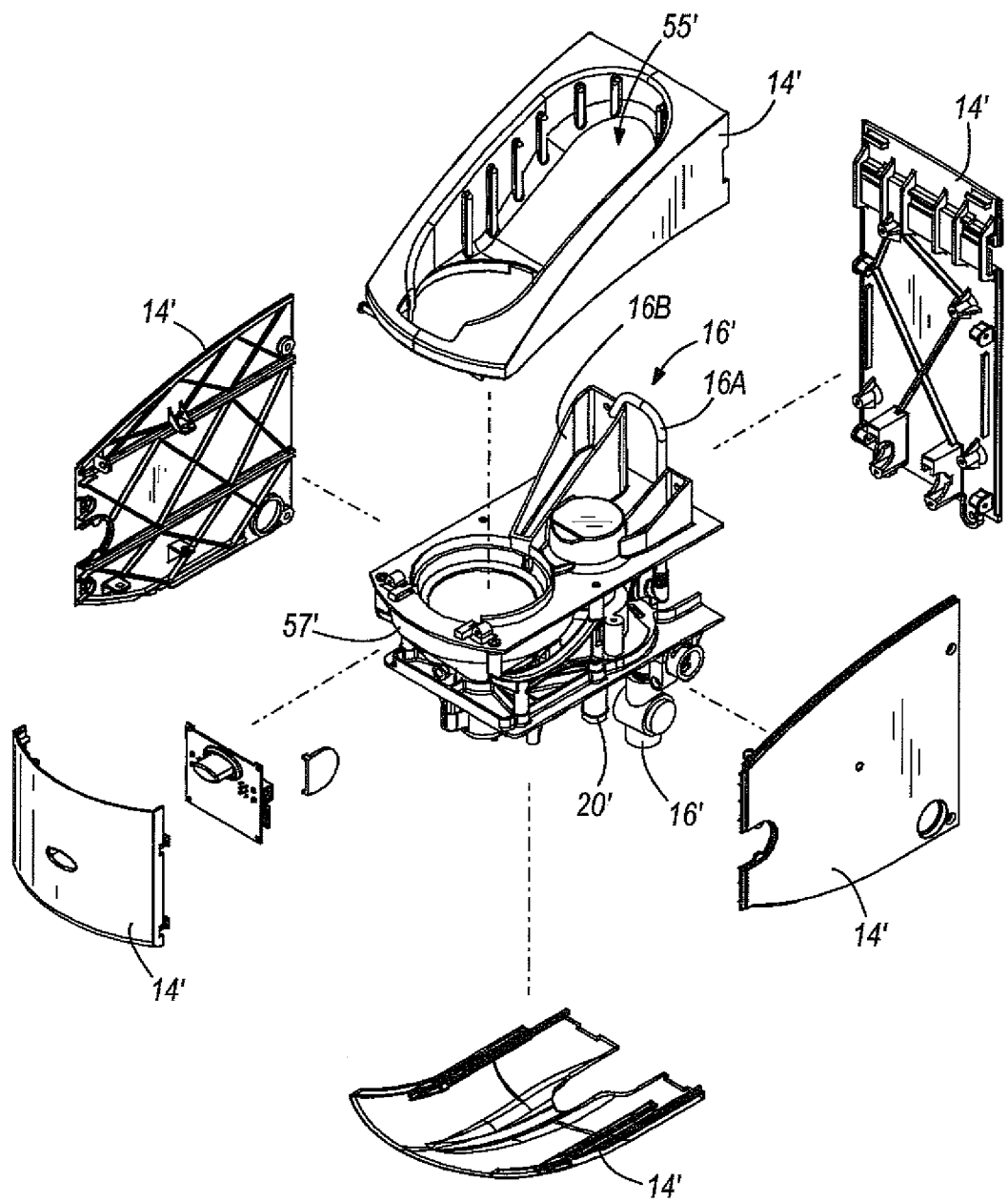
FIG. 19 is an exploded view of the dispenser shown in FIG. 13.
Figure 20:
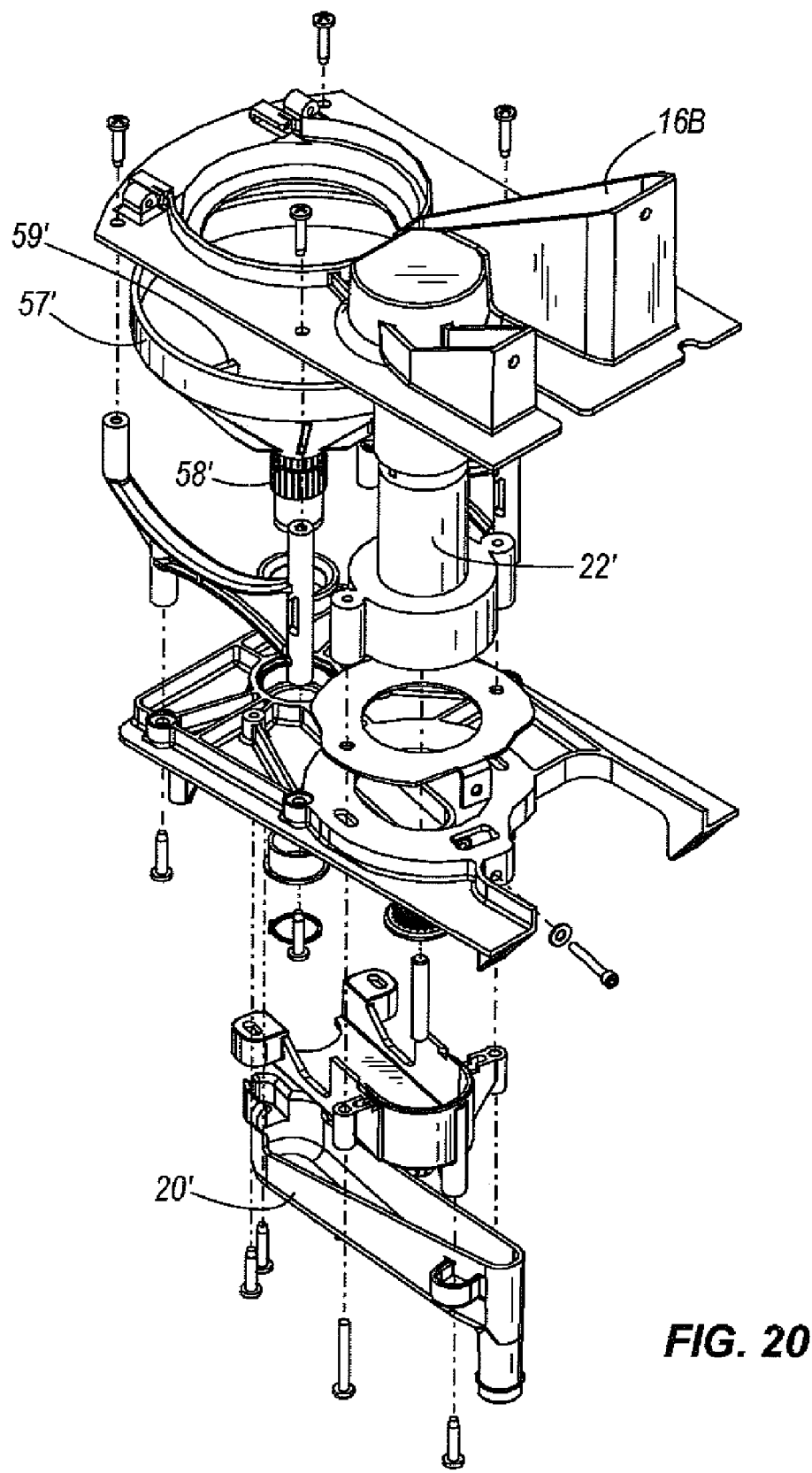
FIG. 20 is an exploded view of certain components and subassemblies of the dispenser shown in FIG. 13.
Figure 21:
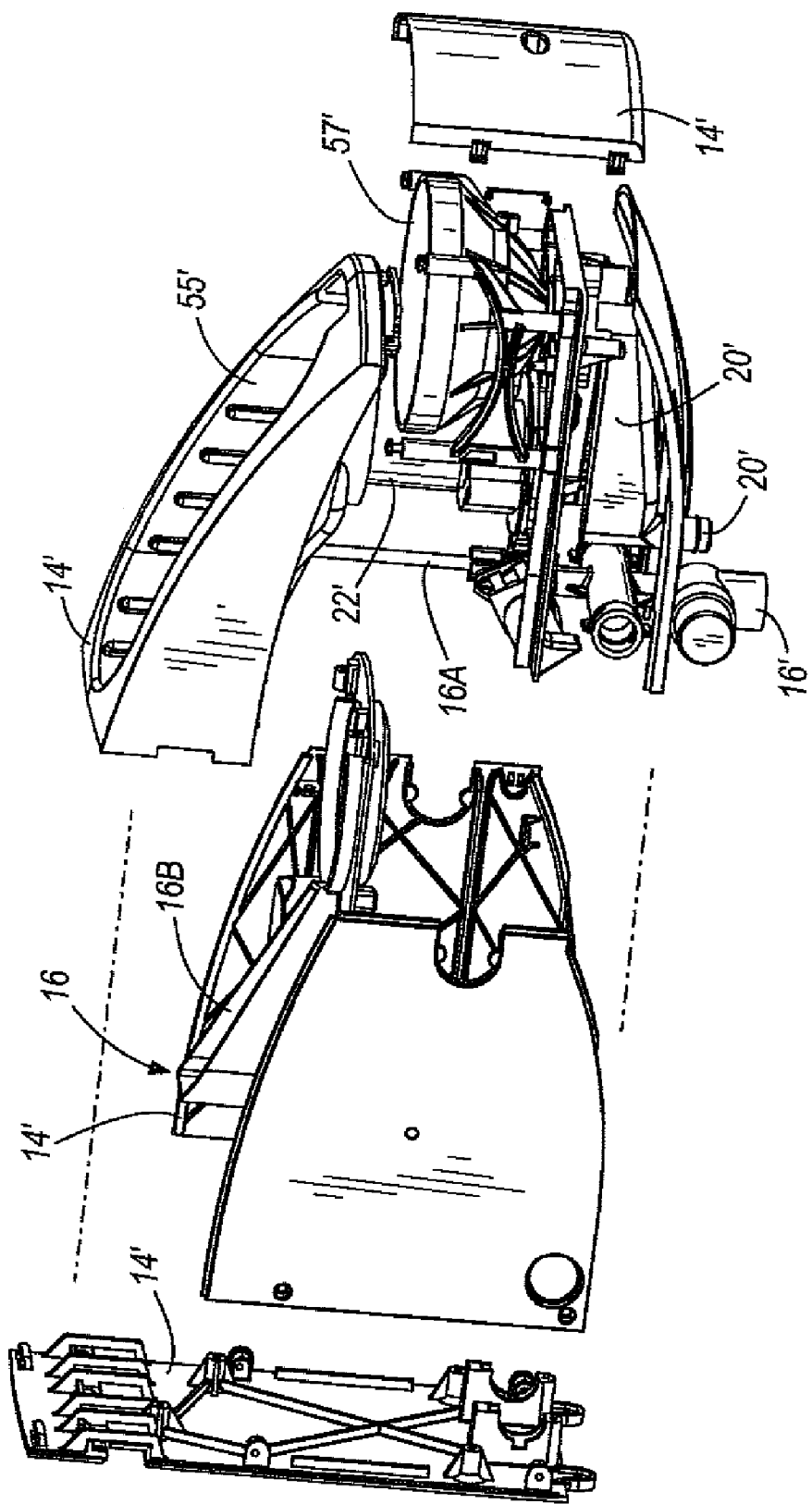
FIG. 21 is a partial side view of the dispenser shown in FIG. 13, revealing the inner components of the dispenser.

With reference to FIG. 13, a dispensing assembly 14' is shown mated to a container 12'. Although it is not illustrated in this figure, a closure 10 embodying aspects of the invention is attached to the container. With reference to FIGS. 18-22 is can be seen that the dispensing assembly 14' includes a cradle 55' adapted to receive the closure 10 and a portion of the container 12. The dispensing assembly 14' also includes a water intake conduit 16' controlled by a valve 18' to introduce water into the receptacle 14', a funnel assembly 57' to receive dispensed chemicals and water, and a water solution outlet conduit 20' in communication with the funnel assembly 57'. The dispensing assembly 14' also includes a drive member 22' that drives the funnel in a rotary motion, which in return drives the closure 10' between dispensing and non-dispensing positions.

With further reference to FIGS. 18-21, it can be seen that water inlet conduit 16' has a first portion 16A' and a second portion 16B' separated by an air gap 17'. The air gap 17' serves as a backflow prevention device. As water or other diluent flows, it flows through the first portion 16A' of the conduit 16' and then flows across the air gap 17' into the second portion 16B' of the conduit 16'. In this second portion 16B' of the conduit 16', the water flows toward the funnel assembly 57'. In the illustrated embodiment, the second portion 16B' has a channel-like configuration. Once the water leaves the second portion 16B' of the water inlet conduit 16', the water then flows through the funnel assembly 57' to flush dispensed chemicals out of the funnel assembly 57'.

Figure 22:
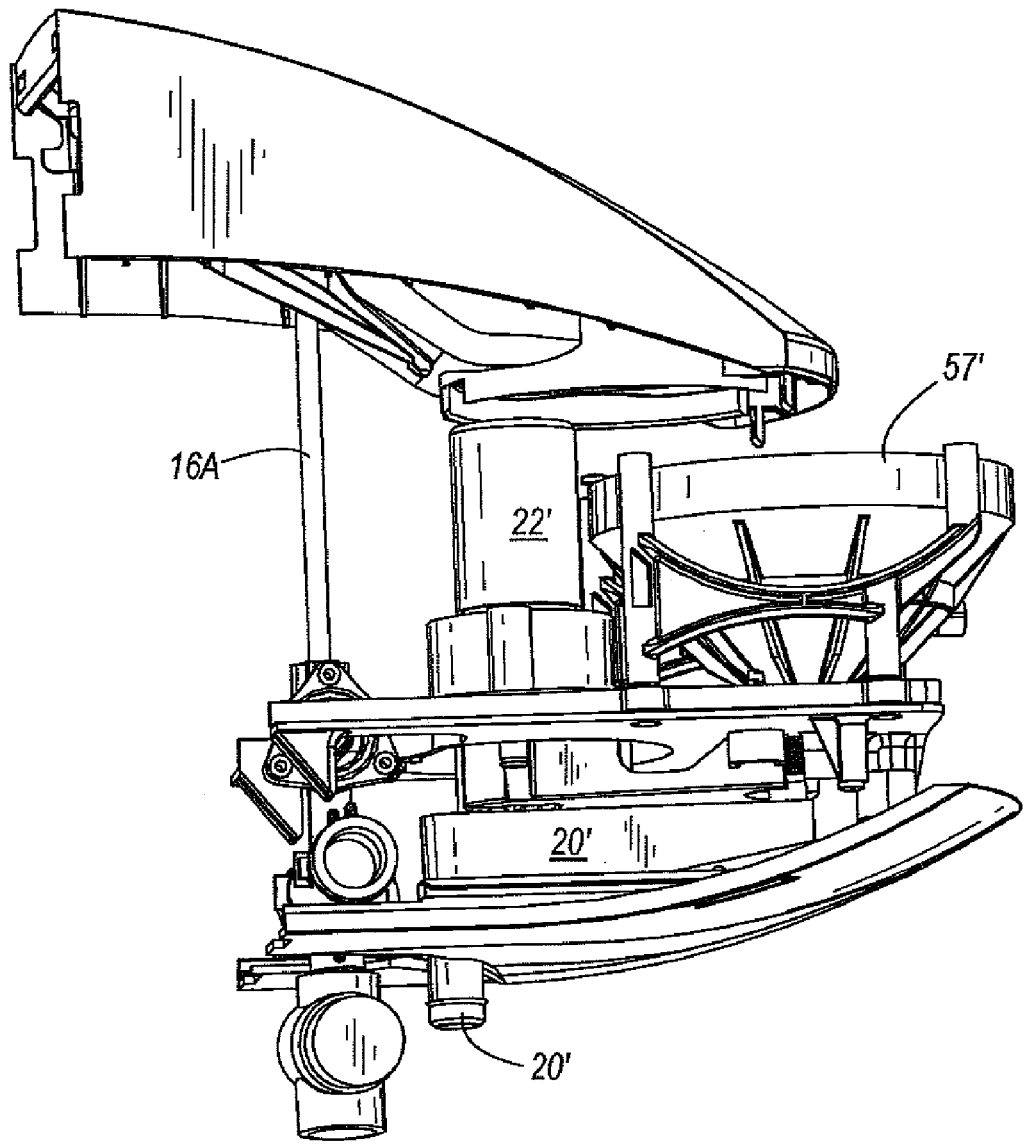
FIG. 22 is a perspective view of a funnel utilized in the dispenser shown in FIG. 13.
Figure 23:
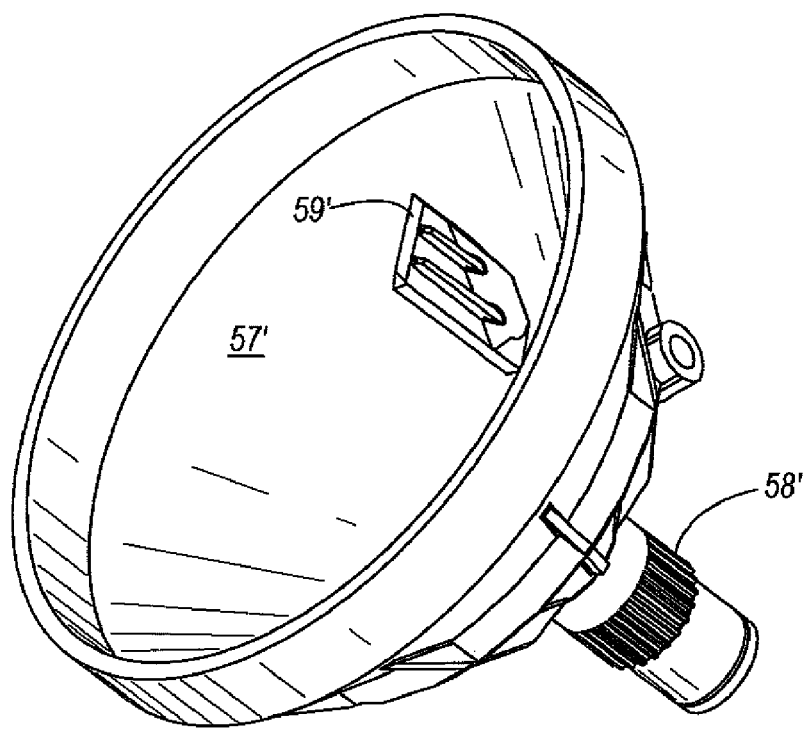
FIG. 23 is a side view of the funnel shown in FIG. 22.

As illustrated in this embodiment, the funnel assembly 57' has a unique structure. Specifically, as best illustrated in FIGS. 22 and 23, the funnel assembly 57' is provided with a means for rotating. More specifically, the drive member 22' provides power to the funnel assembly 57' to drive the funnel assembly 57' in a rotary motion. The rotary motion of the funnel assembly 57' serves two purposes in this embodiment. First, the rotary motion allows the water to flush the entire funnel assembly 57' and prevent any caking or other deposits from remaining in the funnel 57'. Additionally, the rotary motion allows the funnel assembly 57 to be used to drive the closure 10' between dispensing and non-dispensing positions. This helps to avoid some potential problems that may be seen in the first embodiment of the dispenser or receptacle 14. Specifically, in the current embodiment, the chances of the drive member 22' contacting the chemical-water solution are drastically reduced. In the first embodiment, if the seal 28 leaked, the drive member 22 could potentially be ruined by contact with the chemical solution. In this embodiment, the drive member 22' is not positioned where liquids can easily contact the drive member 22'.

In the embodiment illustrated in FIGS. 18-21, the funnel 57' is supported in the housing of the dispenser 14' in a bearing type relationship. The funnel 57' is provided with drive connection 58'. In the illustrated embodiment, the drive connection 58' is a toothed portion that engages a similarly toothed belt that is powered by a motor. However, in other embodiments, the drive portion can be configured other ways. For example, the drive portion can be given a gear tooth profile that can be driven directly by a motor or other gear train. Additionally, the funnel can be powered by other means known and understood in the art.

As best shown in FIG. 22, the inside of the funnel is provided with a projecting member, such as a finger or tab 59' that extends upward from the inner surface of the funnel 57'. As explained in greater detail below, this tab 59' extends toward and engages a portion of the closure 10' to selectively drive the closure between dispensing and non-dispensing positions. The tab 59' illustrated in this embodiment is just one of many ways to drive the closure 10' with the funnel 57'. It should be understood that many other means can be used to drive the closure with the funnel, such as an engagement between the periphery of the closure 10' and the funnel 57'. Further, the tab 59' from the funnel 57' could be received within a recess on the closure 10' in some embodiments.

Also, as illustrated in FIGS. 22 and 23, the funnel can be provided with a device so that the position of the funnel and the closure can be sensed or otherwise determined by the dispenser 14'. In the illustrated embodiment, a magnet 61 is coupled to the funnel 57' and sensed by the dispenser 14'. A Hall effect sensor can be used to sense the magnet. With such a device, the dispenser can always know the rotational position of the closure and the funnel 57' and stop the funnel 57' and the closure 10 in a predetermined position after a select number of rotations. Although the use of a magnet and Hall effect sensor are disclosed, other embodiments can employ other position sensing techniques by using optical encoders, contact sensors, as well as other known techniques. Furthermore, although the position sensing device or portion thereof is coupled to the funnel 57' in this embodiment, the position sensing device can be coupled to other features such as the motor, the closure, the transmission assembly and the like.

Referring to FIGS. 24-27, a metering and dispensing closure 10E embodying inventive aspects is illustrated. This metering and dispensing closure is composed of the three basic components discussed above in the previous embodiments (i.e., a cap member 30, rotatable disk 36, and rotatable disk 43). However, this embodiment also includes additional features, such as the projecting tab 66E mentioned above to allow the closure 10E to be driven by the funnel 57'. Additionally, as discussed in greater detail below, the closure also includes one or more resilient FIG. 68E adapted to assist with clearing out an opening in the dispensing closure 10E. Further, the closure 10E includes a scraping member 70E to clean and prevent dispensed chemicals from caking on the outside of the closure.

Briefly reviewing the basic structure of the closure 10E, there is a cap member 30E with an upstanding wall 31E and a coupling means 32E, such as threads or snap fit projections for engaging complementary engagement members, such as threads on the container 12. There is also a first moveable member, rotor, or rotatable disk 36E coupled to the inside of the cap 30E. The rotatable disk 36E includes a cutaway portion 38E that allows product to be dispensed from the container 12 and into a measuring chamber 33E of the cap 30E. A second movable member, rotor, or rotatable disk 43E is coupled to the outside of the cap 30E. The first member 36E is coupled to the second movable member 43E via a stub shaft 48E with projections 49E extending between the two members. The stub shaft extends through an opening 34E in the cap member 30E between the two members. The projections engage the other member to connect the two members, such that they rotate together. As illustrated and discussed above, the opening in each disk is rotatably off-set with respect to each other. Accordingly, the contents of the container can never freely communicate with the environment outside the container.

As discussed above, a projecting tab 66E extends from the outer rotatable disk 43E. The tab 66E extends from the disk 43E in a direction generally parallel with the axis of the disk 43E. However, in other embodiments, the tab 66E can extend in other directions. The tab 66E is dimensioned and configured to extend toward the funnel 57' and engage the projection or tab 59' on the funnel 57' when the closure 10E is engaged with the dispenser 14'. As mentioned above, due to this engagement, the funnel 57' can drive the disks 43E, 36E on the closure 10E to selectively rotate and dispense the contents of the container. Specifically, the funnel 57' engages and drives the tab 66E on the outer disk 43E, which causes rotation of the outer disk 43E, and due to the connection between the inner disk 36E and the outer disk 43E, it also causes rotation of the inner disk 36E.

Figure 24:
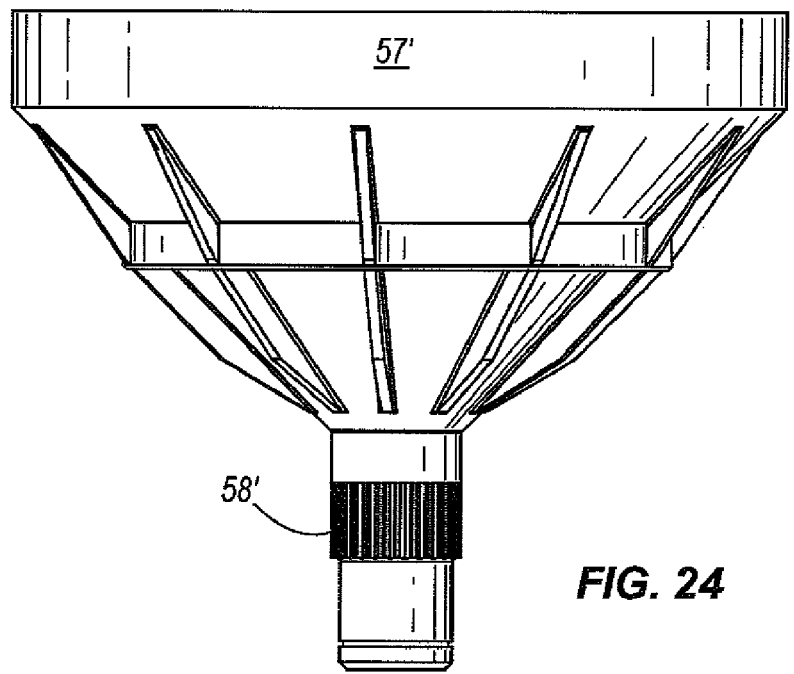
FIG. 24 is a side view of a closure embodying aspects of the invention and adapted to be utilized with the dispenser shown in FIG. 13.
Figure 25:
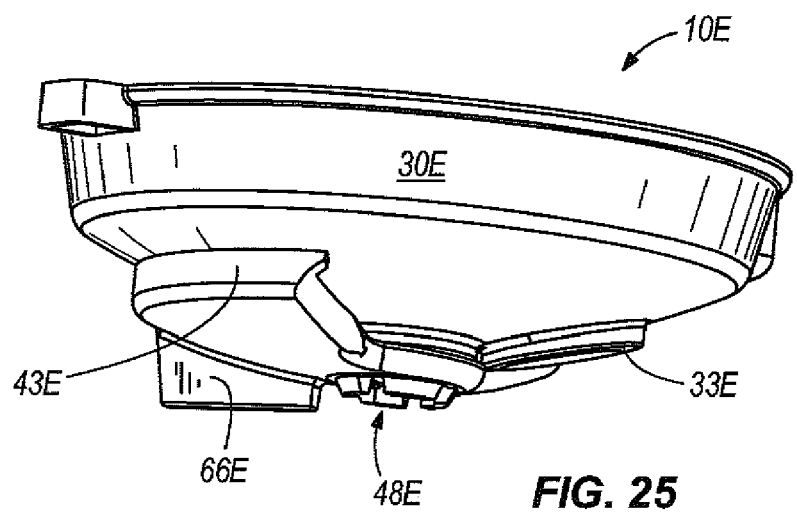
FIG. 25 is a bottom view of a closure shown in FIG. 24.
Figure 26:
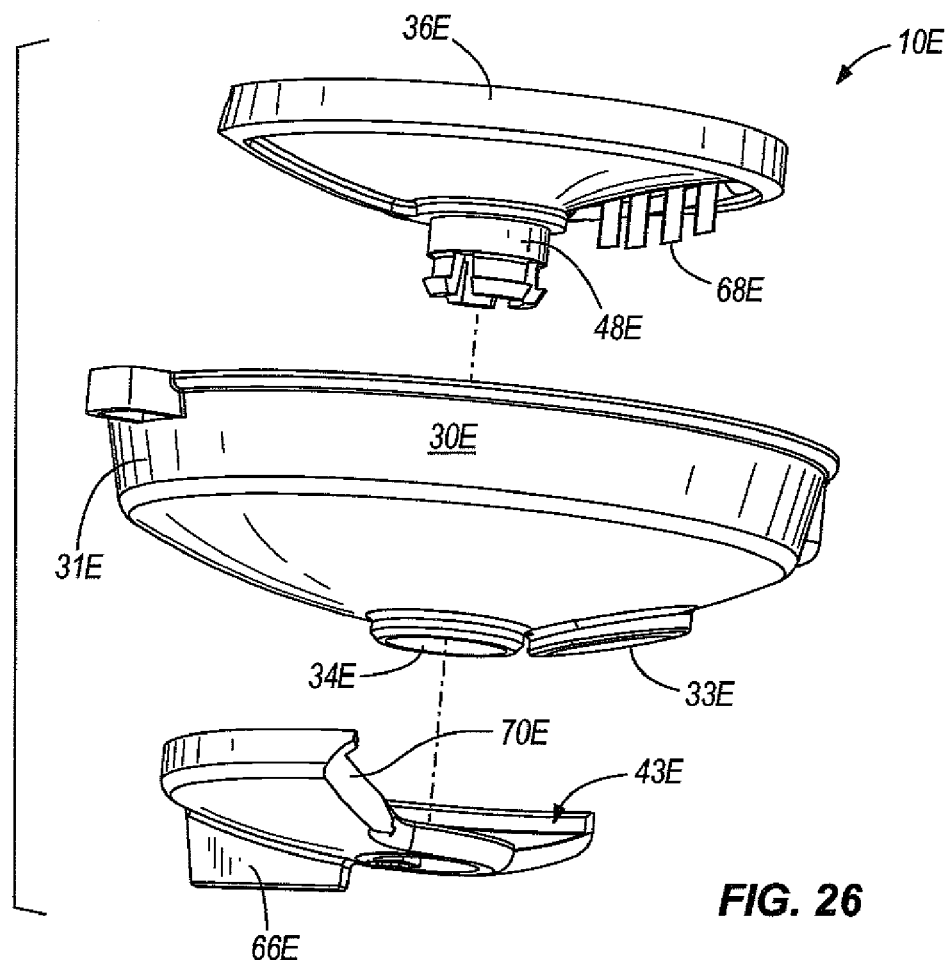
FIG. 26 is an exploded view of the closure shown in FIG. 24.

As illustrated in FIGS. 24-26, the outer disk 43E includes a scraping device 70E positioned on an edge of the opening in the disk 43E. As shown in these drawings, the opening in the disk 43E is generally a sector shaped opening. One edge of the sector shaped opening is provided with a substantially concave shaped edge. The substantially concave shaped edge terminates in a point or an edge forming an acute angle. This edge is dimensioned and configured to contact the opening 33E in the cap 30E when rotated. As the edge passes by the opening 33E, it scrapes any caked or otherwise stuck materials from the outer surface of the opening 33E. Accordingly, with each rotation of the outer disk 43E, any materials stuck to the outer surface of the cap 30E adjacent the opening 33E in the cap 30E should be substantially removed. As noted above, this scraping interface 70E is provided with a generally concave shape. This shape has been shown to help prevent the scraped materials from collecting on the outer surface of the outer disk 43E. However, in other embodiments, this scraping interface 70E can be provided with different configurations. For example, the surface of the scraping interface 70E can be substantially flat.

In some embodiments of the closure, the shape of the dosing hole 33E has been altered. For example, in the illustrated embodiment of FIGS. 24-27, the dosing hole 33E through the cap member 30E is substantially circular. However, in other embodiments, such as the embodiment illustrated in FIGS. 28-30, the dosing hole 33E is more rectangular. More specifically, the shape is a truncated sector, a curved rectangle, or curved trapezoid. In such embodiments, it has been found that some powdered materials are more likely to be encrusted on the closure 10 with this shape than with the circular shape. This may be due to the corners in this configuration, which tend to provide a location for materials to encrust and build-up.

Figure 27:
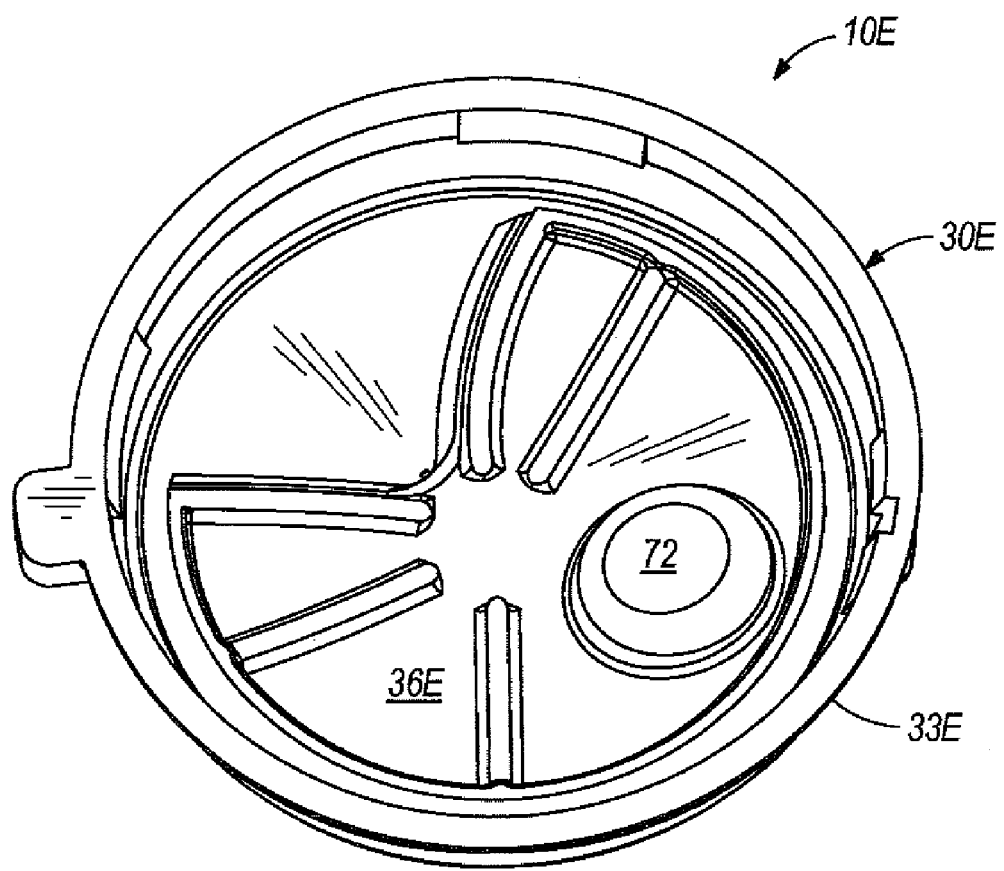
FIG. 27 is a top view of the closure shown in FIG. 25.

As shown in the embodiment illustrated in FIGS. 25-27, the closure 10E can also be provided with elastic fingers or flippers 68E configured and positioned to sweep the contents out of the dosing hole 33E in the cap 30E. The fingers 68E extend from the inner disk 36E toward the inner surface of the cap member 30E. Due to this configuration and the tolerances between the cap and the inner disk, the fingers 68E are generally biased or bent-over by the cap 30E at most times. However, once the fingers 68E become substantially aligned with the dosing hole 33E in the cap 30E, the elastic forces of the fingers 68E cause them to bias back into an extended, substantially non-bent (or less bent position) position, which allows the fingers 68E to extend into the dosing hole 33E. By extending into the dosing hole 33E, the fingers sweep, push, or otherwise provide a force generally sufficient to clear most of the powder from the hole 33E. Note that the fingers 68E are positioned on the inner disk 36E at an appropriate position so that they align with the hole 33E in the cap 30E when the outer disk 43 moves such that the hole 33E is in an open position. In other words, the fingers 68E extend into the hole 33E in the cap 30E when the inner disk 36E is in a closed position relative to the hole 33E and the outer disk 43E is in an open position with respect to the hole. As best shown on FIG. 27, the fingers 68E are located within a recess 72 of the inner disk 36E. This recess 72 generally extends from inner disk 36E away from the cap member 30E. With such a configuration, the fingers 68E are provide with some clearance to bend (when not aligned with the hole 33E), which can reduce the friction between the cap 30E and inner disk 36E.

One other difference between the embodiment shown in FIGS. 25-27 and the embodiments presented earlier is that the closure 10E or cap 30E of this embodiment is provided with a curved or generally funnel-shaped inner surface. The shape of this surface provides an advantage of funneling the contents of the container to the opening in the closure. As such, the contents of a container having this shape to the cap may dispense better.

A better understanding of the metering and dispensing device illustrated in FIGS. 13-27 will be had by a description of its operation. The dispensing closure 10E coupled to container 12' filled with a powdered material. The dispensing closure 10E and the container are supported in the dispensing receptacle 14' as shown in FIG. 13.

When it is desired to dispense the powdered or granulated materials within the container 12', the drive member 22' is actuated to cause the funnel 57' to rotate. Rotation of the funnel 57' causes the disks 36E, 43E on the closure 10E to rotate. Specifically, engagement between a projection 59' on the funnel 57' and a projection on the outer disk 43E of the closure 10E cause the transfer of power from the funnel 57' to the closure 10E. Actuation of the outer disk 43E causes the inner disk 36E to rotate as described above.

When powdered material is to be dispensed from the container 12, the rotatable disks 36E and 43E will be placed in the position shown in FIGS. 3 and 3A. Note that although FIGS. 3 and 3A illustrate a different embodiment, some of the main principles of operation are consistent better these two embodiments. Accordingly, earlier embodiments may be referenced to indicate relative positions of the disks with respect to each other. As shown in FIGS. 3 and 3A, the inner disk 36E is positioned to allow the contents of the container 12 to communicate with the opening 33E in the cap member 30E (open position) and the outer disk 43E is positioned to block the flow of materials out of the opening 33E in the cap member 30E (closed position). In this position, the granular or powdered materials within the container 12 flow into the opening 33E in the cap 30E. Since the outer disk 43E blocks the flow of materials out of the opening 33E (or measuring chamber) in the cap 30E, a specific known amount of material can flow into and fill the opening 33E.

To dispense the materials contained within the opening 33E of the cap 30E, the inner and outer disks 36E and 43E are rotated through a position illustrated in FIGS. 4 and 4A to a position as illustrated in FIGS. 5 and 5A. In this position, the inner disk 36 blocks the opening 33 in the cap member 30 and the outer disk 43 is positioned to allow materials to flow out of the opening 33 in the cap 30. Accordingly, the materials within the opening 33 can fall out of the opening 33 in the cap 30. Further, although it is not illustrated, the fingers or flickers 68E on the inner disk substantially align with and resiliently extend from a biased or bent over position to a substantially extended position while the outer disk 43E allows the opening 33E to be open. The extension of these fingers 68R help to remove most additional materials that may be building up or caked within the opening 33E.

Once the measured amount is dispensed, the disks preferably continue to rotate to a position wherein the outer disk 43E closes or blocks the opening 33E in the cap 30E. This will help prevent moisture from entering the opening 33E in the closure 10E. Most preferably, the disks 36E, 43E on the closure 10E stop in a position wherein both the inner disk 36E and the outer disk 43E are positioned to block or close the opening 33E. While moving to one of these preferred positions, the scraping device 70E on the outer disk 43E passes over the outer rim or surface of the opening 33E in the cap 30E and engages stuck, caked, or encrusted materials on the outer surface of the opening 33E to remove those materials.

Once the powdered or granular materials are dispensed from the container 12 via the closure 10E, the materials fall into the funnel 57' and are flushed from the funnel 57' by water entering the funnel 57'. Rotation of the funnel 57' helps assure that the water flushes all materials out of the funnel 57'. Once the chemicals are mixed with the water, they can be dispensed via the outlet 20'.

Figure 28:
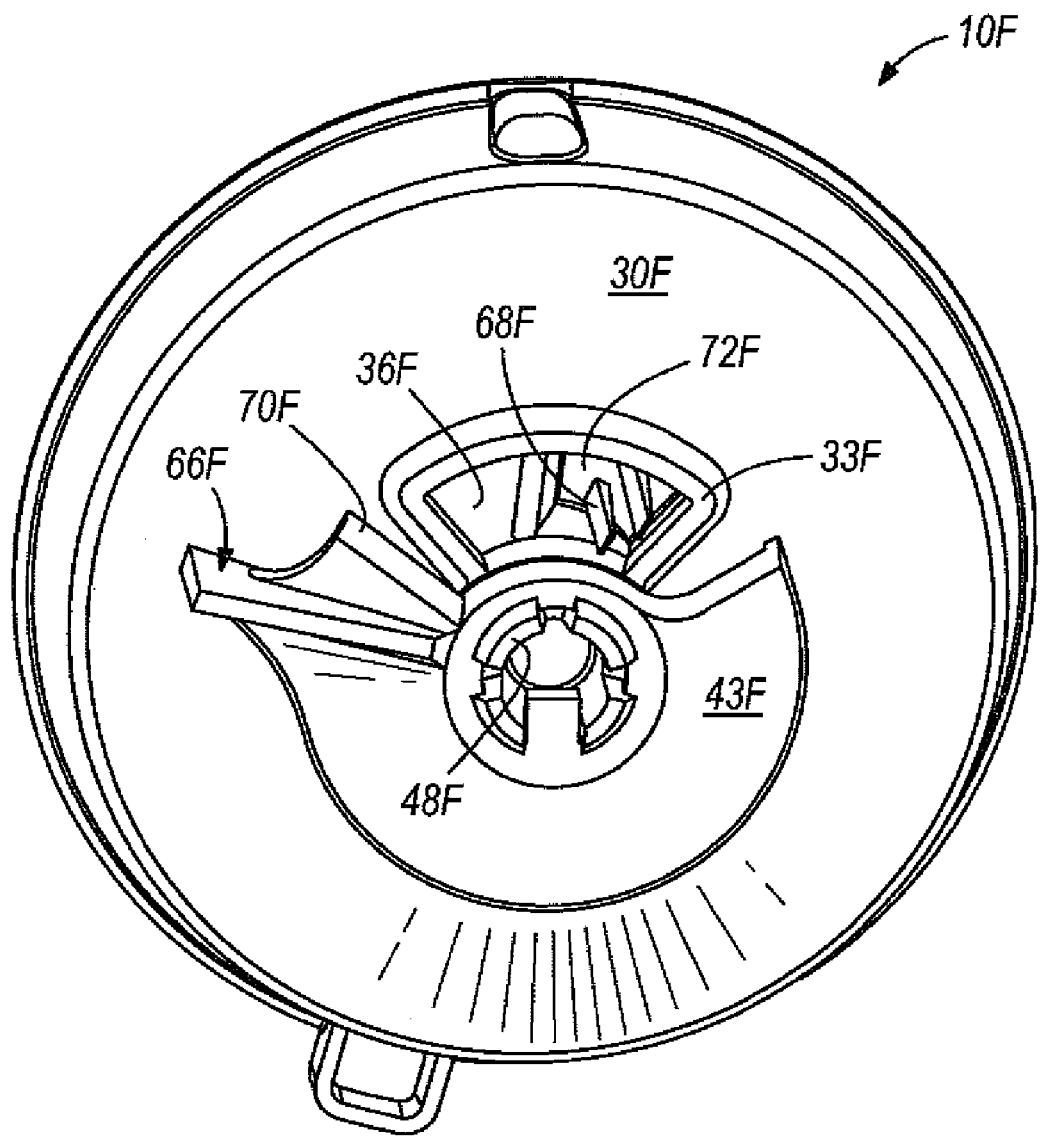
FIG. 28 is a perspective view of an alternative closure adapted to be utilized with the dispenser shown in FIG. 13.
Figure 29:
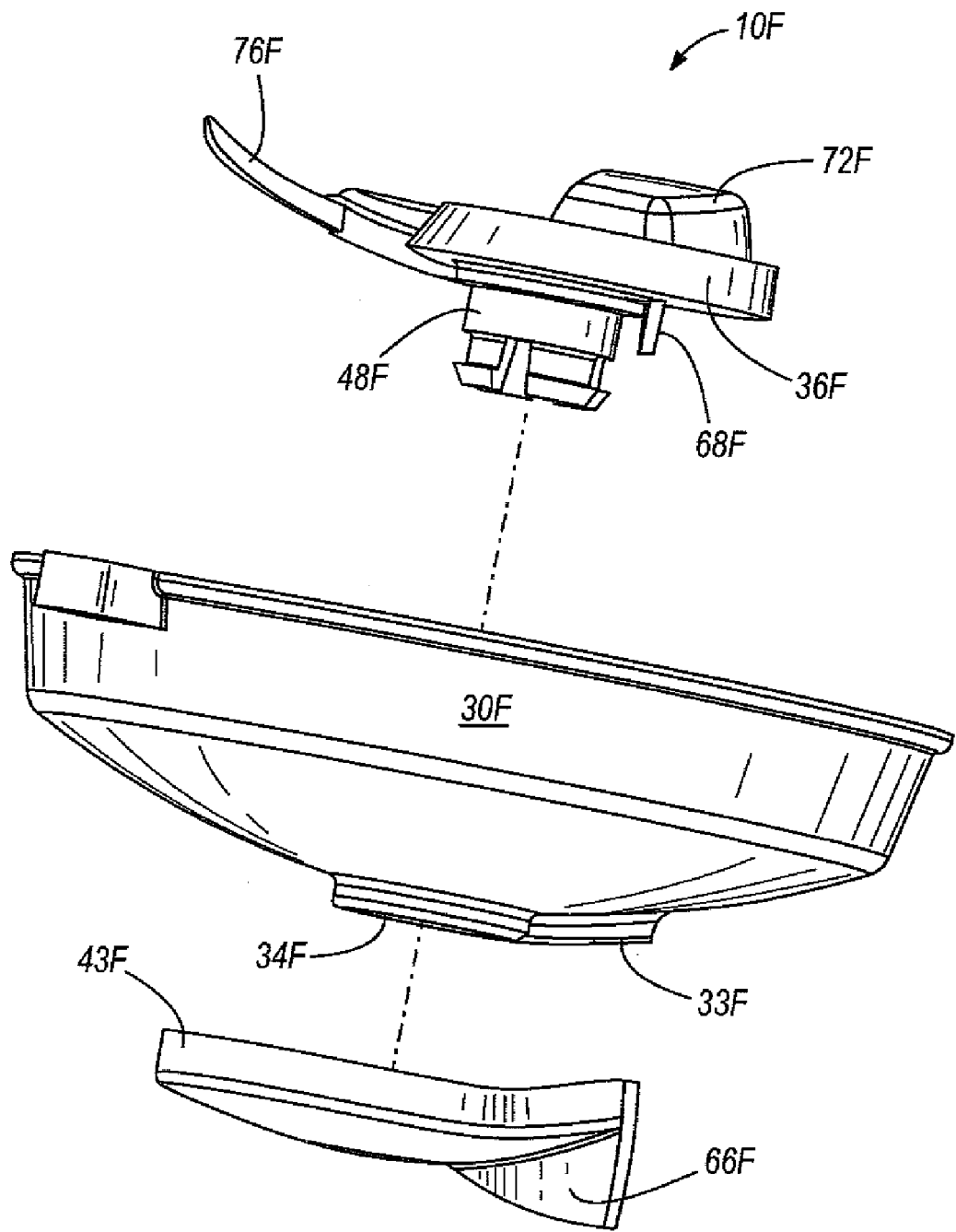
FIG. 29 is an exploded view of the closure shown in FIG. 28.
Figure 30:
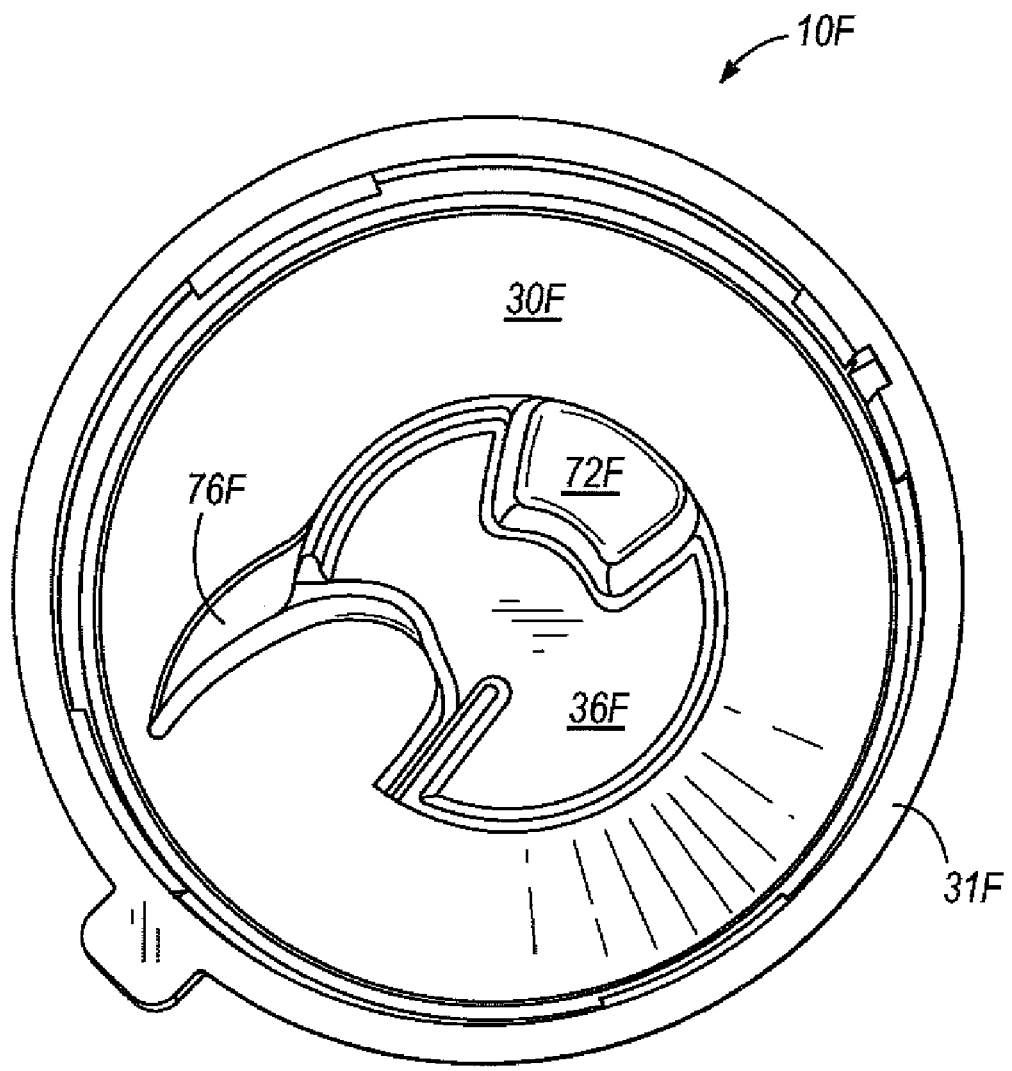
FIG. 30 is a top view of the closure shown in FIG. 28.
Figure 31:
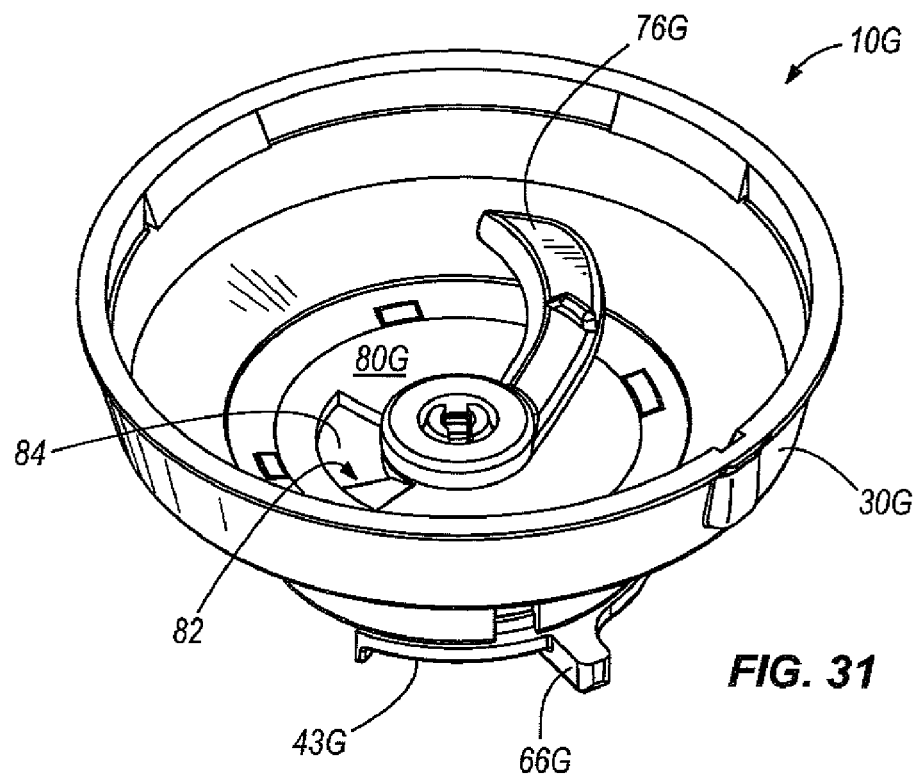
FIG. 31 is a perspective view of an alternative closure adapted to be utilized by the dispenser shown in FIG. 13.
Figure 32:
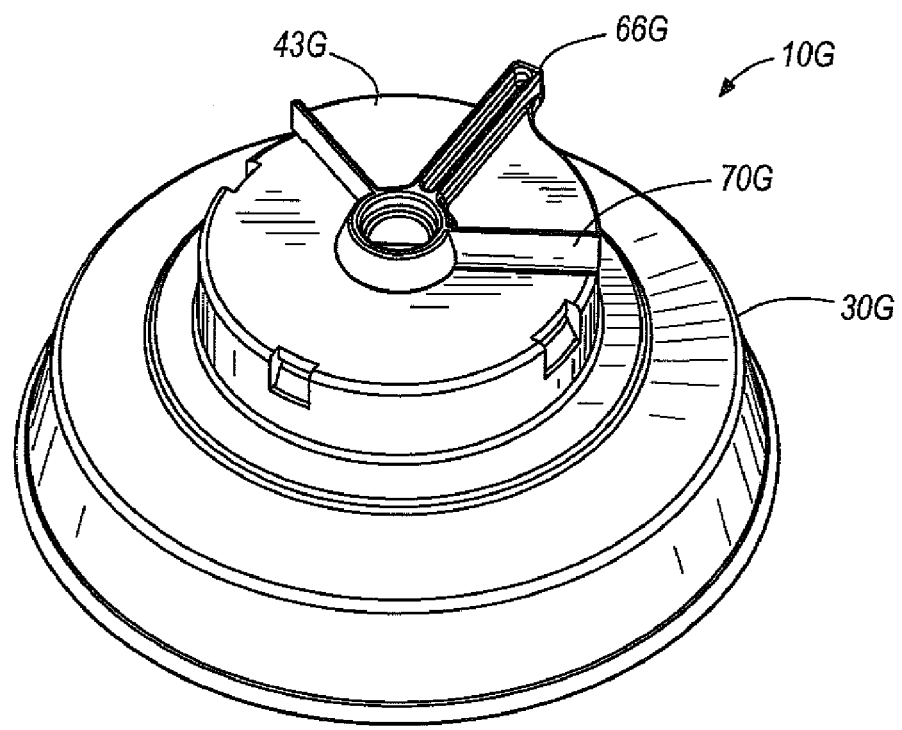
FIG. 32 is another perspective view of the closure shown in FIG. 31.
Figure 33:
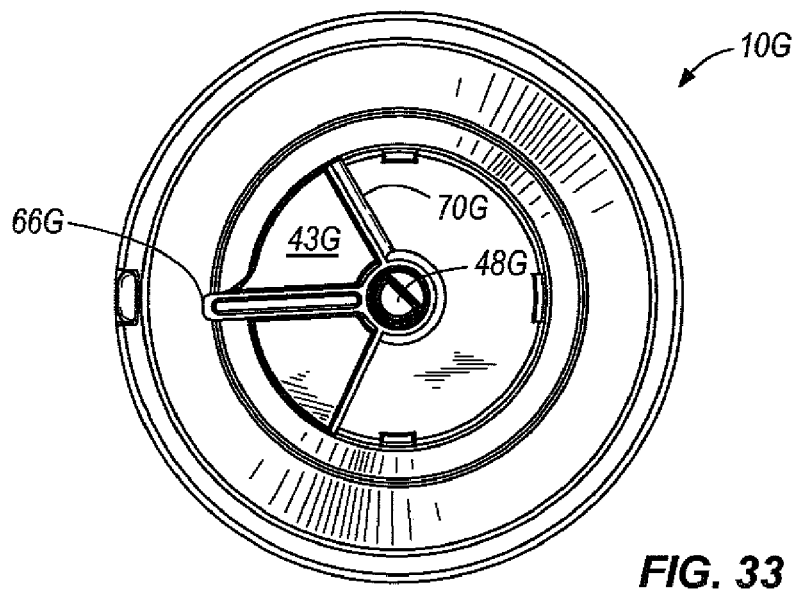
FIG. 33 is a bottom view of the closure shown in FIG. 31.
Figure 34:
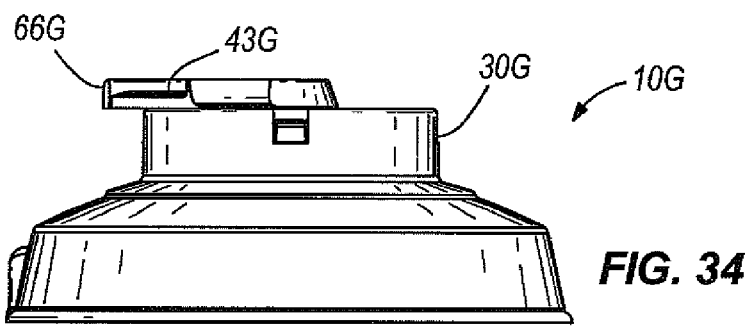
FIG. 34 is a side view of the closure shown in FIG. 31.
Figure 35:
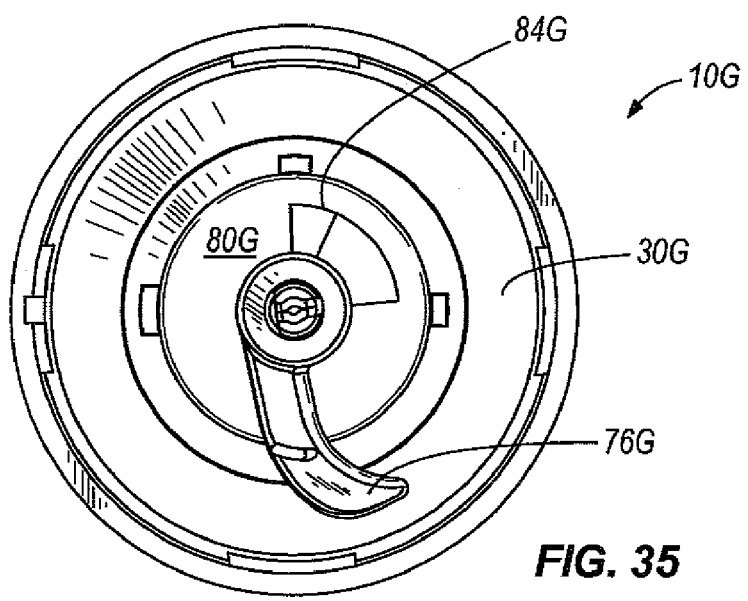
FIG. 35 is a top view of the closure shown in FIG. 31.

Referring to FIGS. 28-30, a metering and dispensing closure 10F is illustrated. This metering and dispensing closure 10F is configured and dimension to operate with the dispenser or receptacle 14' illustrated in FIG. 13. This metering and dispensing closure 10F is composed of the three basic components discussed above in the previous embodiments (i.e., a cap member 30, rotatable disk 36, and rotatable disk 43). However, this embodiment also includes many of the additional features of the embodiment illustrated in FIGS. 25-27, such as the projecting tab 66F mentioned above to allow the closure 10F to be driven by the funnel 57', the resilient FIG. 68F adapted to assist with clearing out an opening 33F in the dispensing closure 30F, the scraping member 70F on the outer disk 43F, and the generally concave shape of the closure 10F relative to the container. For a detailed description of these features, please reference the embodiments described above. The focus of the description of this embodiment will be on the features of this embodiment that are substantially different than the previous embodiments.

One distinct difference between this embodiment and the previous embodiments is the shape of the opening 33F in the cap member 30F. In the previous embodiments, the shape of the dosing hole 33F is substantially circular. However, in this embodiment, the dosing hole 33F is more rectangular. More specifically, the shape is a truncated sector, a curved rectangle, or a curved trapezoid. Due to this configuration, the recess 72F housing the resilient fingers 68F also has a similar shape.

With reference to FIGS. 29 and 30, it can be seen that this embodiment is provided with a hook-like member 76F that extends from the inner disk 36F. This hook-like member 76F stirs, agitates, and/or drives dispensable materials within the container toward the opening 33F in the closure 10F. Accordingly, with such a feature, the container may be better depleted relative to the previous embodiments. As illustrated, the hook-like member 76F generally extends along and adjacent the inner surface of the cap 30F. The hook-like member 76F is also generally curved to follow the generally concave profile of the cap 30F.

FIGS. 31-36 illustrate another closure 10G adapted to be used with the dispensing assembly shown in FIG. 13. This closure 10G has many features in common with the previous embodiments, but operates under a slightly different principle than the previous embodiments. The previous embodiments used two moving members (e.g., disks 36, 43) to selectively block and unblock a static, non-moving aperture or measuring chamber 33 in the cap 30. This embodiment, however, constructed slightly different than the previous embodiments to incorporate a moving measuring chamber.

Like the previous embodiments, this embodiment includes a cap member 30G and two moveable members 36G, 43G to meter the dispensing of contents from a container 12' coupled to the closure 10G. However, the closure 10G of this embodiment arranges the moveable members 36G, 43G in a manner somewhat different from the previous embodiments. The cap 30G generally has many features in common with the previous embodiments, such as a generally concave shape to funnel materials to an aperture 33G in the cap 30G and walls that engage a container. Accordingly, these features will not be discussed in depth.

As shown in FIGS. 31-36, this closure 10G includes a cap member 300, an outer rotor or rotating disk 43G, and an inner rotor or rotating disk 36G. The closure 10G also includes a baffle plate 80G and a rotating hook-like member or arm 76G. The cap member 30G has an inner surface relative to the container that it is adapted to be coupled to and an outer surface. The inner surface is generally concave shaped to help direct materials within the container to a dispensing position and to better deplete the bottle. The outer surface of the cap 30G that is positioned adjacent the outer rotor 43G is generally flat. This generally flattened surface has been found to prevent encrustation or other build-up of dispensed product. The cap member 30G has two apertures in this generally flattened surface. One aperture 34G is substantially centered in the cap 30G to receive a shaft. The other aperture 33G is generally off-center. This second aperture 33G defines an opening in the cap member wherein materials contained within the container 12 can be dispensed.

As previously described, the outer rotor 43G is positioned on the outside surface of the cap 30G. The outer rotor 43G has a shaft 48G that extends through the cap 30G to define a pivot for the rotor 43G. As shown in the figures, the outer rotor 43G has a generally sector-like shape configured and dimensioned to selectively block the opening 33G in the cap 30G. Rotation of the outer rotor 43G causes the rotor to selectively block and unblock the opening 33G in the cap 30G. The outer rotor 43G can be driven many ways, as described above. However, in the illustrated embodiment, a projecting member 66G, such as an arm or tab, extends from the outer rotor in a generally radial direction. This projecting member 66G is engaged by and driven by the projection drive member 59' on the funnel 57', as described above. The outer rotor 43E also has a scraping member 70G, as described above, which engages the substantially flat outer surface of the cap 30G to remove caked, encrusted, or otherwise stuck dispensed materials.

Figure 36:
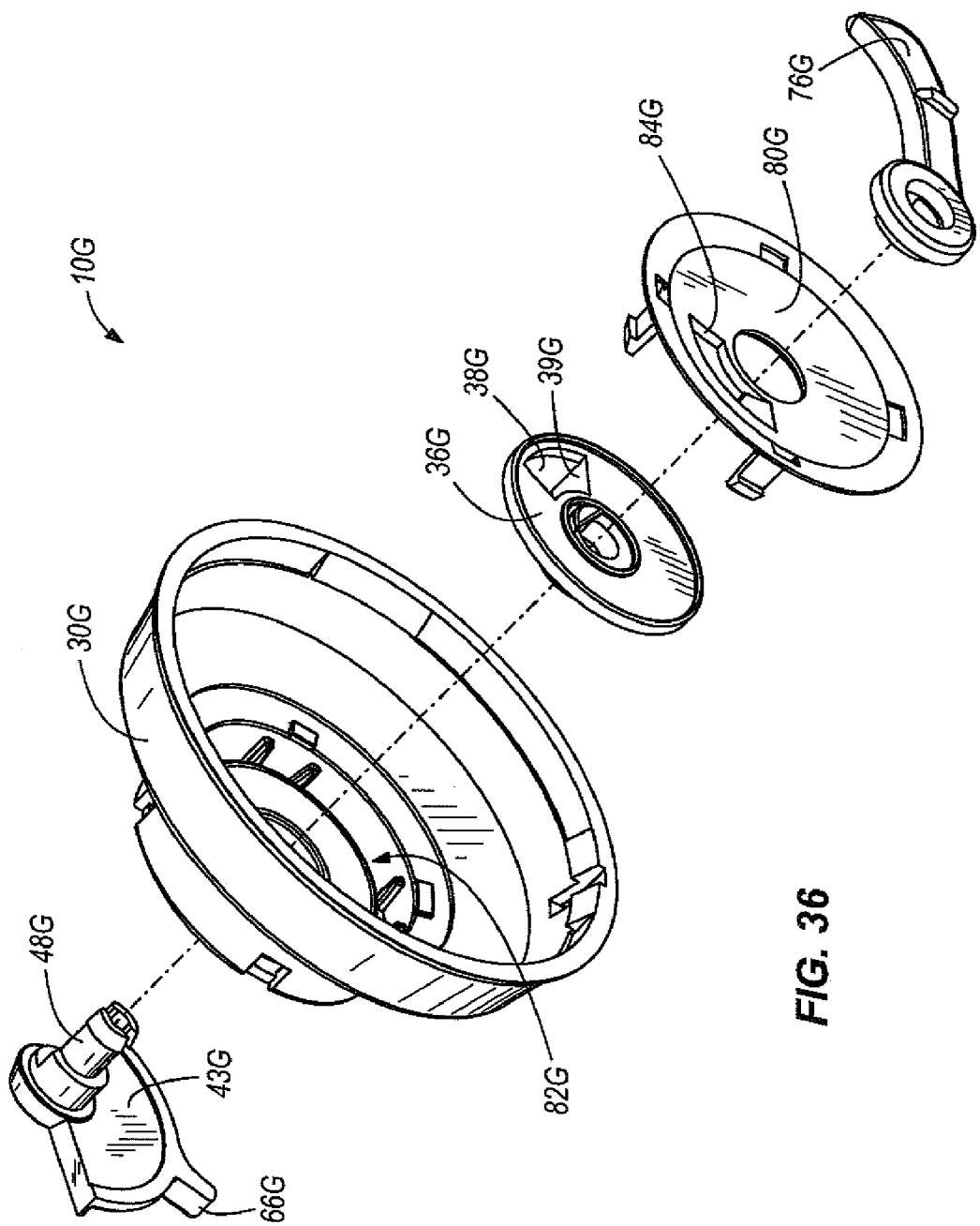
FIG. 36 is an exploded perspective view of the closure shown in FIG. 31.

The inner rotor 36G is positioned on the inside of the cap 30G and rests with a recess 82G of the cap (FIG. 36). Like the previous embodiment, the inner rotor 36G is coupled to the outer rotor 43G such that rotation of one rotor causes rotation of the other rotor. Specifically, as illustrated, the inner rotor 36G is coupled to a shaft 48G extending from the outer rotor 43G. As best illustrated in FIG. 36, the inner rotor 36G has a generally circular body and an aperture 38G extending through the body. A wall 39G extends in a generally axial direction adjacent this aperture to at least partially define a metering chamber. As mentioned above and described in greater detail below, this metering chamber rotates with the inner rotor 36G to deliver a predetermined quantity of product from within the container 12 to the aperture 33G in the cap 30G. This wall 39G positioned adjacent the aperture 38G acts as a ram to drive the predetermined quantity of material to a dispensing position. In some embodiments, this wall 39G or additional walls extending from the inner rotor 36G can have an interfering fit against the cap 30G so that the wall 39G may be slightly flexed when not aligned with the opening 33G in the cap 30G. When the wall 39G passed over the opening 330 or other slightly projecting member on the inner surface of the cap 30G, it can momentarily get caught against the opening 33G or projecting member. Once the wall 39G flexes sufficiently due to continued rotation of the rotor 36G, the wall 39G will be resiliently biased back to a less flexed position.

This biasing will cause sufficient vibration to release stuck, caked, or compacted materials within the opening or measuring chamber.

As mentioned above and shown in FIGS. 31, 35, and 36, the closure includes a baffle plate 80G. The baffle plate 80G is coupled to the cap 30G in a non-rotatable manner. The baffle plate 80G is positioned adjacent the inner rotor 36G. When the baffle plate 80G is coupled to the cap 30G, the baffle plate 80G at least partially forms a recess 82G within the cap 30G for housing the inner rotor 36G. The baffle plate 80G has an aperture 84G to allow materials within the container 12 to move passed the baffle plate 80G and enter the measuring chamber 38G of the second rotor 36G, when the second rotor 36G is properly aligned with aperture 84G in the baffle plate 80G.

Finally, as noted above, the closure 10G also has a hook-like member or arm 76G that rotates adjacent the baffle plate 80G. This hook-like member 76G helps to deliver materials within the container to the opening 84G in the baffle plate 80G.

In operation, the rotors 36G, 43G are rotated to selectively dispense product from the container. During the rotation of the rotors, the opening 30G in the inner rotor 36G will be placed in communication with the contents of the container 12. Specifically, this occurs when the opening 38G in the inner rotor 36G at least partially aligns with the opening 84G of the baffle plate 80G. During this time when the inner rotor 36G is in communication with the contents of the container 12, the opening 38G in the inner rotor 36G will fill with a predetermined amount of material. As the inner rotor 36G rotates, eventually, the opening 38G in the inner rotor 36G is no longer in communication with the opening 84G in the baffle plate 80G. Accordingly, no more materials from the container 12 can enter the opening 38G in the rotor 36G. At this point, the materials contained within the inner rotor 36G are neither in communication with the contents in the container or the environment. These materials are not in communication with the environment outside the container because the opening 38G in the inner rotor 36G is not yet aligned with the opening 33G in the cap 30G. Once the opening 38G in the inner rotor 36G is at least partially aligned with the opening 33G in the cap 30G, materials can begin to exit the inner rotor 36G and cap 30G. Through continued rotation of the inner rotor 36G, the entire contents of materials contained within the opening 38G of the inner rotor 36G should exit the container 12 via the opening 33G in the cap 30G. Further rotation of the rotors allows the outer rotor 43G to pass over the opening 33G in the cap 30G and block the opening 33G. Accordingly, this can prevent moisture from entering the opening 33G when materials are not being dispensed. As the outer rotor 43G passes over the opening 33G, the scraping member 70G removes any encrusted or otherwise stuck materials from the cap 30G.

The dispensing closure of this invention has been described in conjunction with particular configurations of receptacles or dispensing assemblies. It should be understood that any type of receptacle or dispensing assembly can operate in conjunction with this dispensing closure. They do not necessary have to have a receptacle dispensing assembly that contains water. For example, they could be utilized in a receptacle and supported therein where the powder material would drop into another container having a liquid predisposed therein. Neither is it necessary that the dispensing closure be employed in conjunction with a receptacle or dispensing assembly employed with water. Other liquids such as water miscible and immiscible solvents including water and ether could be employed.

Additionally, the dispensing closures illustrated herein can be utilized with other containers. For example, in some embodiments, the container may have two or more chambers containing separate chemicals within each chamber. The chambers can be utilized to keep two or more chemicals separate from each other until dispensed. In one particular example it may be desirable to separate the chemicals due to their storage incompatibility. In such an embodiment, the closure could be provided with an opening communicating with each chamber. One complete rotation could then dispense the materials contained within each chamber either simultaneously or sequentially depending upon the configuration of the closure.

As mentioned above in the background section, one particular advantage of the illustrated closures is that they provide greater flexibility with respect to the formulations dispensed for cleaning applications. Conventionally, detergents, the most commonly fed powders, are limited to formulations that will not create excess exothermic heat if the substantial moisture should penetrate into the powder. This has typically meant that the caustic (typically NAOH or KOH) level needed to be kept below about 40% to prevent the possibility of steam generation within the container. However, with the metering and dispensing closures of this invention this limitation is substantially removed due to the inability of moisture to enter the container because of the construction of the closure. Accordingly, more powerful detergent powders can be formulated with perhaps up to 70% caustic concentrations without the threat of exothermic heat generation. This would represent a 40% to 50% increase in "power" in a single container.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention. For example, the moveable members, rotors, or disks described above can move in manners other than those described above. Specifically, the moveable members can also include sliding members that move in a linear, curvilinear, or other path between open and closed positions to selectively block the aperture in the cap. Furthermore, various alternatives to the certain features and elements of the present invention are described with reference to specific embodiments of the present invention. With the exception of features, elements, and manners of operation that are mutually exclusive of or are inconsistent with each embodiment described above, it should be noted that the alternative features, elements, and manners of operation described with reference to one particular embodiment are applicable to the other embodiments.

All such and other modifications within the spirit of the invention are meant to be within the scope as defined by the appended claims.

Various features of the invention are set forth in the following claims.

What is claimed is:

1. A dispensing closure for a container, the dispensing closure comprising:
   a cap adapted to be received on the container, the cap having an inside face, an outside face, and an aperture extending from the inside face to the outside face through the cap to allow materials within the container to be dispensed;

a first movable member positioned adjacent the inside face of the cap to selectively block the aperture in the cap, the first movable member being movable between a first position in which the aperture is blocked and a second position in which the aperture is not blocked;

a second movable member positioned adjacent the outside face of the cap to selectively block the aperture in the cap, the second moveable member being movable between a first position in which the aperture is blocked and a second position in which the aperture is not blocked, movement of the first moveable member and the second moveable member is sequenced such that at least one of the moveable members is always blocking the aperture; and a plurality of resilient fingers coupled to the first movable member and extending from the first movable member toward the cap, the fingers being movable with the first movable member between a position in which the fingers are not aligned with the aperture and a position in which the fingers are aligned with the aperture, the resilient fingers extend into the aperture of the cap when the fingers are in the aligned position.

2. The dispensing closure of claim 1, wherein the fingers are aligned with the aperture in the cap when the first movable member is in a position that blocks the aperture and the second movable member is in a position in which the aperture is not blocked.

3. The dispensing closure of claim 1, wherein when the fingers are not aligned with the aperture in the cap, the fingers contact the cap and are biased by cap towards a bent over position, and when the fingers are aligned with the aperture in the cap, the fingers resiliently return to a substantially unbiased position and extend into aperture.

4. The dispensing closure of claim 1, wherein the fingers are positioned within a recessed portion of the first movable member, the recessed portion extending away from the cap.

5. The dispensing closure of claim 1, wherein the movable members rotate between the first and second position.

6. The dispensing closure of claim 5, wherein the first movable member has a first passage defined in the first movable member and the second movable member has a second passage defined in the second movable member, wherein rotation of the first and second movable members selectively and sequentially place the first and second passages in communication with the aperture.

7. The dispensing closure of claim 6, wherein the first passage is rotatably offset relative to the second passage.

8. The dispensing closure of claim 7, wherein the second movable member comprises an edge that contacts and passes over the aperture in the cap when the second movable member moves from the second position back to the first position, the edge comprises a generally angled surface terminating at a point defining an acute angle.

9. The dispensing closure of claim 1, further comprising a hook-liked member extending from the first movable member adjacent the cap, wherein the hook-liked member is configured to drive granular or powdered materials contacted by the hook-like members toward the center of the cap.

10. The dispensing closure of claim 1, wherein the cap and first moveable member have a substantially concave shape.

11. The dispensing closure of claim 10, wherein the second movable member has a substantially concave shape.

12. A dispensing closure for a container, the dispensing closure comprising:

a cap adapted to be received on the container, the cap having an inside face, an outside face, and an aperture extending from the inside face to the outside face through the cap to allow materials within the container to be dispensed;

a first movable member positioned adjacent the inside face of the cap to selectively block the aperture in the cap, the first movable member being movable between a first position in which the aperture is blocked and a second position in which the aperture is not blocked;

a plurality of resilient fingers coupled to the first movable member and extending from the first movable member toward the cap, the resilient fingers extending into the aperture of the cap when the fingers are aligned with the aperture; and a second movable member positioned adjacent the outside face of the cap to selectively block the aperture in the cap, the second moveable member being movable between a first position in which the aperture is blocked and a second position in which the aperture is not blocked, the second movable member comprises an edge that contacts and passes over the aperture in the cap when the second movable member moves from the second position back to the first position, the edge comprises a generally angled surface terminating at a point defining an acute angle, movement of the edge over the aperture removes a dispensed material coupled to an outer surface of the cap adjacent the aperture;

wherein the movement of the first moveable member and the second moveable member is sequenced such that at least one of the moveable members is always blocking the aperture.

13. The dispensing closure of claim 12, wherein the generally angled surface of the edge includes a concave portion.

14. The dispensing closure of claim 12, wherein the fingers are movable with the first movable member between a position in which the fingers are not aligned with the aperture and a position in which the fingers are aligned with the aperture.

15. The dispensing closure of claim 14, wherein the fingers are aligned with the aperture in the cap when the first movable member is in a position that blocks the aperture and the second movable member is in a position in which the aperture is not blocked.

16. The dispensing closure of claim 12, wherein when the fingers are not aligned with the aperture in the cap, the fingers contact the cap and are biased by cap towards a bent over position, and when the fingers are aligned with the aperture in the cap, the fingers resiliently return to a substantially unbiased position and extend into aperture.

17. The dispensing closure of claim 12, wherein the fingers are positioned within a recessed portion of the first movable member, the recessed portion extending away from the cap.

18. The dispensing closure of claim 12, wherein the movable members rotate between the first and second position.

19. The dispensing closure of claim 18, wherein the first movable member has a first passage defined in the first movable member and the second movable member has a second passage defined in the second movable member, wherein rotation of the first and second movable members selectively and sequentially place the first and second passages in communication with the aperture.

20. The dispensing closure of claim 19, wherein the first passage is rotatably offset relative to the second passage.

21. The dispensing closure of claim 12, further comprising a hook-liked member extending from the first movable member adjacent the cap, wherein the hook-liked member is configured to drive granular or powdered materials contacted by the hook-like members toward the center of the cap.

22. The dispensing closure of claim 12, wherein the cap and first moveable member have a substantially concave shape.

23. The dispensing closure of claim 22, wherein the second movable member has a substantially concave shape.

24. A dispensing closure for a container, the dispensing closure comprising:
- a cap adapted to be received on the container, the cap having an inside face, an outside face, and an aperture extending from the inside face to the outside face through the cap to allow materials within the container to be dispensed;
- a first movable member positioned adjacent the inside face of the cap to selectively block the aperture in the cap, the first movable member having a first passage and movable between a first position in which the aperture is blocked and a second position in which the aperture is not blocked;
- a second movable member positioned adjacent the outside face of the cap to selectively block the aperture in the cap, the second movable member having a second passage and movable between a first position in which the aperture is blocked and a second position in which the aperture is not blocked, the first passage rotatably offset relative to the second passage, the second movable member further having an edge that contacts and passes over the aperture in the cap when the second movable member moves from the second position back to the first position, the edge including a generally angled surface terminating at a point defining an acute angle, and the angled surface having a concave portion; and
- a plurality of resilient fingers coupled to the first movable member and extending from the first movable member toward the cap, the fingers being movable with the first movable member between a position in which the fingers are not aligned with the aperture and a position in which the fingers are aligned with the aperture, the resilient fingers extend into the aperture of the cap when the fingers are in the aligned position,
- wherein movement of the first movable member and the second movable member is sequenced such that at least one of the movable members is always blocking the aperture, and
- wherein the first and second movable members rotate between the first and second positions such that the first and second passages are selectively and sequentially placed in communication with the aperture.

\* \* \* \* \*